United States Patent [19]

McCalley et al.

[11] Patent Number: 5,191,410
[45] Date of Patent: Mar. 2, 1993

[54] INTERACTIVE MULTIMEDIA PRESENTATION AND COMMUNICATIONS SYSTEM

[75] Inventors: Karl W. McCalley, South Barrington; Steven D. Wilson, Chicago; James L. Fischer, Barrington, all of Ill.

[73] Assignee: Telaction Corporation, Schaumburg, Ill.

[21] Appl. No.: 652,238

[22] Filed: Feb. 5, 1991

Related U.S. Application Data

[63] Continuation of Ser. No. 573,262, Aug. 24, 1990, abandoned, which is a continuation of Ser. No. 453,184, Dec. 15, 1989, abandoned, which is a continuation of Ser. No. 271,086, Nov. 14, 1988, abandoned, which is a continuation-in-part of Ser. No. 81,189, Aug. 4, 1987, Pat. No. 4,792,849.

[51] Int. Cl.⁵ .................... H04N 7/173; H04N 7/10
[52] U.S. Cl. ........................ 358/86; 379/105
[58] Field of Search ................ 379/96, 102, 104, 105; 358/85, 86; 455/5

[56] References Cited

U.S. PATENT DOCUMENTS

| | | | |
|---|---|---|---|
| 4,008,369 | 2/1977 | Theurer et al. | 358/84 |
| 4,028,733 | 6/1977 | Ulicki | 360/10 |
| 4,071,697 | 1/1978 | Bushnell et al. | 358/85 |
| 4,381,522 | 4/1983 | Lambert | 358/86 |
| 4,450,477 | 5/1984 | Lovett | 358/86 |
| 4,450,481 | 5/1984 | Dickinson | 358/114 |
| 4,451,701 | 5/1984 | Bendig | 379/96 |
| 4,455,570 | 6/1984 | Saeki et al. | 358/86 |
| 4,581,484 | 4/1986 | Bendig | 379/96 |
| 4,616,263 | 10/1986 | Eichelberger | 358/185 |
| 4,645,873 | 2/1987 | Chomet | 379/95 |
| 4,700,322 | 10/1987 | Benbassat et al. | 379/96 |
| 4,734,764 | 3/1988 | Pocock et al. | 358/86 |
| 4,788,682 | 11/1988 | Vij et al. | 379/96 |

FOREIGN PATENT DOCUMENTS

| | | | |
|---|---|---|---|
| 1112380 | 11/1981 | Canada | 379/4 |
| 1152206 | 8/1983 | Canada | 350/30 |
| 2062419 | 5/1981 | United Kingdom | . |
| 2174874 | 11/1986 | United Kingdom | 358/86 |

OTHER PUBLICATIONS

S. Fedida, "View data", Wireless World, May 1977 vol. 83, No. 1497.

*Washington Post*, "Home Shopping Network Halts Talks", Feb. 19, 1987.

Primary Examiner—James L. Dwyer
Assistant Examiner—Wing F. Chan
Attorney, Agent, or Firm—Amster, Rothstein & Ebenstein

[57] ABSTRACT

A system is provided for interactively and selectively communicating particular multimedia presentations to each of a plurality of subscribers along a CATV cable network. The subscriber communicates his selections, both for viewing particular presentations from a menu and for transactions with respect to the information and products being viewed, by entering codes on his Touch-Tone telephone pad. Subscriber input signals are communicated as digital signals through the intercommunications network and response signals are generated, ultimately as analog TV signals for viewing by the subscriber.

53 Claims, 24 Drawing Sheets

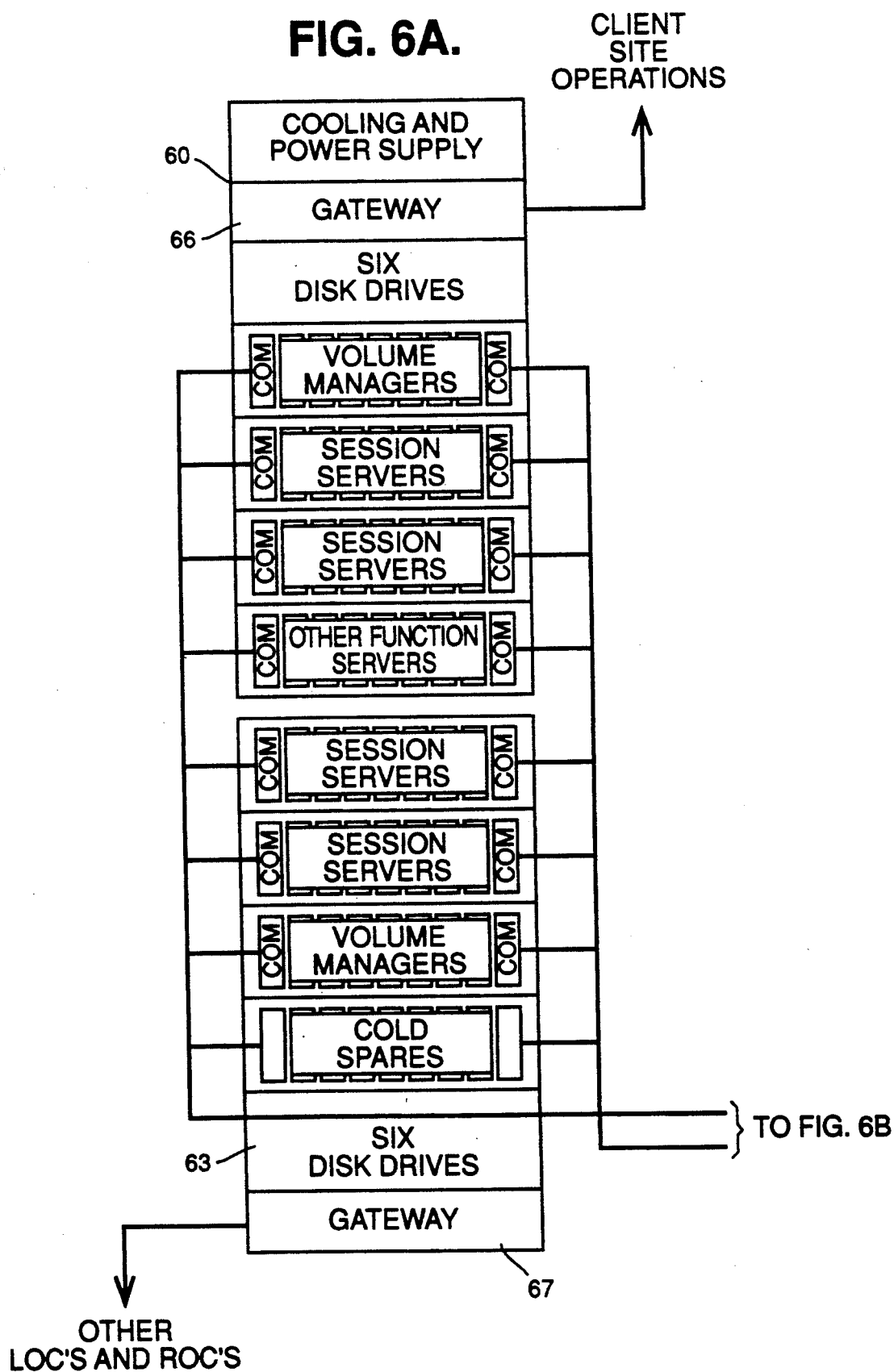

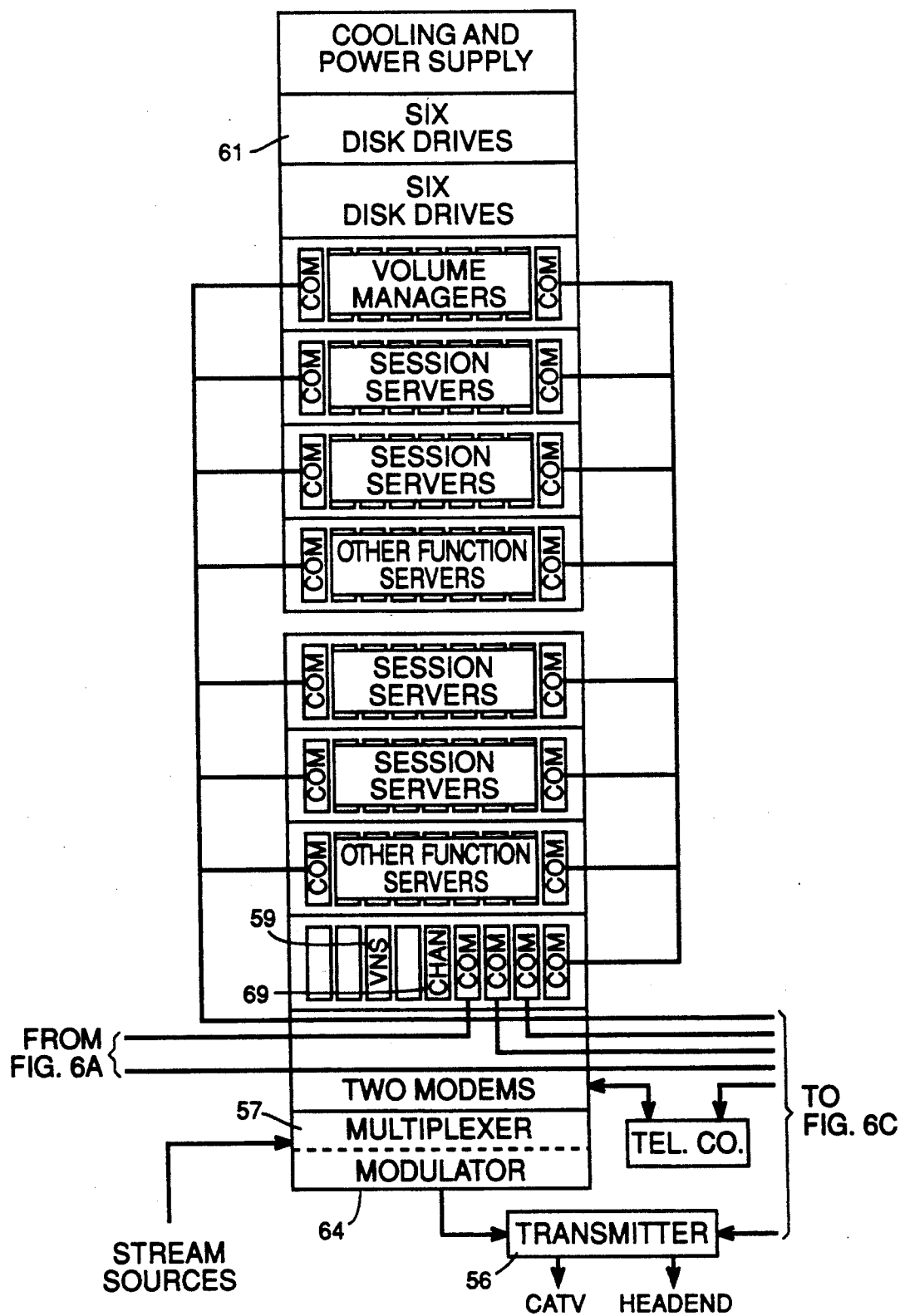

INTERACTIVE MULTIMEDIA PRESENTATION AND COMMUNICATIONS SYSTEM

This application is a continuation of Ser. No. 07/573,262 filed Aug. 24, 1990 (abandoned), which is a continuation of Ser. No. 07/453,184 filed Dec. 15, 1989 (abandoned), which is a continuation of Ser. No. 07/271,086 filed Nov. 14, 1988 (abandoned), which is a continuation-in-part of Ser. No. 07/081,189 filed Aug. 4, 1987, now U.S. Pat. No. 4,792,849.

FIELD OF THE INVENTION

The present invention relates to an interactive multimedia presentation and communications system which can deliver to a subscriber's television set particular video images depicting information about items of interest which the subscriber has requested, along with accompanying audio commentary or music. In broad terms, a subscriber who uses the system (generally transmitted on cable TV) tunes his TV set to a predetermined channel, telephones a local number, follows log-on instructions given over the telephone, and then uses the Touch-Tone keypad of his telephone to navigate through an electronic information system which displays multimedia presentations in the form of video images and accompanying audio on various items selected by the subscriber. The invention relates to the apparatus and means by which these presentations are selectively transmitted to particular subscribers, and not with the specific subject matter described in the presentations.

In particular, this type of interactive multimedia presentation and communications system is well suited, though not at all limited, to providing the functions and capabilities of an electronic shopping mall. In this context, a subscriber generally sees video images and hears an audio commentary about shopping products he has chosen to look at and possibly purchase. In addition to audio commentary, background music and other general information may be available. Limited forms of motion video which may include short sequences of panning, zooming, and live motion are also provided. Thus, the system permits a shopper, in the comfort of his home, to browse through an "electronic mall" of different shops, obtain detailed information on particular items, and make purchases. More particularly, this invention relates to and describes an interactive multimedia presentation and communications system ("IMPACS"), in which all the video and audio information is stored, processed and transmitted to the locality of the subscriber in digital form.

BACKGROUND OF THE INVENTION

Home shopping by use of the television has been growing in popularity in recent years. Generally, home shopping channels are transmitted on a community antenna television (CATV) facility. The CATV facility, which has the capacity for transmitting a large number of commercial and public television signals, is usually connected to homes via a network of coaxial cables. In most of the home shopping systems being offered to date, subscribers passively view the home shopping channel, watch items and pricing being presented by television sales people, and if interested in a particular item, place an order over the telephone or by mail. Similarly, televised real estate offerings which present still-video pictures and information about homes for sale in a particular area are also becoming a popular method of communicating such information to a mass audience. These systems are non-interactive, in the sense that a viewer may passively watch items as they are presented on the television screen, but cannot control the course of the presentation.

More advanced interactive systems have been designed and implemented, wherein viewers are able to request a display of particular items in which they have an interest, and can control their information retrieval or perform individualized shopping as they proceed. A system of this sort is described in U S. Pat. No. 4,734,764, entitled "Cable Television System Selectively Distributing Pre Recorded Video and Audio Messages". This prior art invention describes a system which conveys still frame television quality video with overlaid graphics information and an audio message (when appropriate), to a multiplicity of CATV subscribers who tune to a specific cable channel. The subscriber, by use of a Touch-Tone telephone, transmits particular codes in response to message prompts which are displayed in menu form on the TV screen, and is able to request video displays and information on specific products as well as make purchases. The user of this system requires no additional equipment at his location other than a Touch-Tone telephone and a television set.

In order to interactively operate this type of prior art system, a subscriber tunes to the CATV channel which is being used for transmission, and dials a telephone number to gain access to the system. Each subscriber is given a particular identification number upon subscribing to the service. When this identifying number is entered via the Touch-Tone telephone keypad, the system recognizes the subscriber and his location. Graphic overlays which depict menus and directories of "electronic stores" that are on the system are then displayed, and by responding to these menus with a sequence of keystrokes on the Touch-Tone telephone keypad, the subscriber may, by means of selected video images, enter and browse through a particular store of his choice (or follow other shopping paradigms such as going down a particular aisle in a supermarket), select a particular product of interest, make purchases or request additional information or help. By selecting from a list of menu prompts which are displayed on the television screen, and which the subscriber enters on the Touch-Tone keypad, his television screen displays still-frame video, having overlaid graphics where appropriate, and possibly accompanied by a sound track that presents information about the requested item.

This prior art system uses a CATV cable network to transmit the requested video presentations and accompanying audio messages to its subscribers. In conventional television transmission, video images are transmitted at the rate of 30 frames per second (the North American or Japanese standard), or 25 frames per second (the European standard). A video frame is an interleaved composition of two video fields, with each video field being further composed of a plurality of scan lines which contain the video image information and a smaller plurality of scan lines referred to as the "vertical blanking interval". The interactive system described in U.S. Pat. No. 4,734,764 makes use of the vertical blanking interval (which consists of the first 21 lines of the video field) to store information which identifies the particular subscriber's reception device to which the requested video images and audio commentary are addressed. The control center of the CATV system (the CATV headend) transmits the frames of video and audio data, with this addressing information encoded in the vertical blanking interval, along the main "trunk" coaxial cables of the system in analog form. In order to compensate for signal losses which naturally occur as a result of transmission, CATV cable systems utilize amplifiers positioned at various locations downstream from the control center. At each of these locations, the signals from the control center are amplified and further transmitted down a plurality of secondary distribution cables. At points along the secondary distribution cables are "taps", at which the signals are split into a plurality of "drop" cables which terminate at subscribers' television sets.

To accommodate a large number of concurrent subscribers, the interactive system described in U.S. Pat. No. 4,734,764 utilizes a reception device known as a frame store unit, or "frame grabber", typically located near each amplifier of the distribution system. Each frame store unit services a small number of cable drops, and functions to capture the information that is destined for a subscriber whose particular identification code, encoded in the vertical blanking interval, matches an identification code associated with the frame store unit. The video and audio information is transmitted to the frame store unit on two separate channels. The frame store unit captures the analog video and audio information which has the appropriate address encoded in the vertical blanking interval of the frames and stores the information into its memory. The frame store unit then replays the stored video information 30 times per second (according to the U.S. National Television Standards Committee (NTSC) requirement), and transmits the video along with any accompanying audio message to the particular subscriber that it is servicing.

In the prior art system of U.S. Pat. No. 4,734,764, which has been briefly described above, the video and audio presentation which comprises a particular merchandise offering by a commercial client, must first be prepared and encoded onto conventional laser video discs. A plurality of conventional video disc players at the central system site comprise the data storage and playback portion of a subsystem which transmits the appropriate video and audio information in analog form, under control of a central processing unit. The video information is time-multiplexed in the proper sequence, and the audio is appropriately modulated and frequency-division multiplexed for transmission down the CATV cable network.

Numerous problems and limitations are associated with this type of "analog" interactive system, even though the small amount of data that is generated may be transmitted with a link having much less bandwidth. First, a large number of video disc players are required, making the cost and physical size of the electronics for this prior art system exorbitant. Adding to this cost is the utilization of a full bandwidth telephone link for each connection between a subscriber and the host computer of the system, even though the small amount of data that is generated may be transmitted with a link having much less bandwidth. Second, the response time between a subscriber entering a particular code on the telephone keypad and the appearance of a display in response to that code is too slow to establish a comfortable interactive session. The response time in the analog system is limited primarily by the time it takes the video disc player to access a particular location on the disc and can be on the order of three to ten seconds. The slow response time is exacerbated by the graphics overlay process, in which a graphics decoder receives graphics information that is associated with a particular video frame from the central processing unit, generates the appropriate graphics display data and routes this data to a video combiner. The video combiner must first receive the video frame from the video player and then overlay the graphics information onto the frame.

Further, in the prior art analog system, the audio information is stored on the video disc in the electronic format of a video frame. This imposes a maximum limit of ten seconds for the duration of the audio portion associated with a particular frame. In many cases, this time limitation is too restrictive for practical use. In other cases it is wasteful of space.

An additional limitation arises from the choice of a laser disc as the storage medium for the video and audio data. A commercial client who desires to market his merchandise or services on the interactive system of the prior art must undertake a lengthy premastering procedure, required to convert his advertising material (possibly in the format of catalog photographs, video tape information, etc.) into a format which can be encoded onto a video disc master. Multiple copies of the master disc must then be made so that each video disc player in the system can have a copy of the information when it is called upon to deliver a particular presentation to a subscriber. This premastering and duplication process is a time-consuming, linear and batch oriented procedure, generally taking up to 10 weeks from initial setup to final product. The process provides no mechanism for making minor modifications to audio or video images at a later date. If changes are required, a new video disc must be mastered and reproduced. Thus, no reusable archiving is possible.

The prior art analog system is structured with an overly complicated pathway between the subscriber and host computer system which does not generate adequate feedback to either the subscriber or the system. For example, when a subscriber enters a particular sequence of keystrokes, he has no acknowledgment that the sequence has been properly received by the system. Similarly, the system has no feedback that a subscriber has received whatever was transmitted to him. Further, when help from a consumer service representative is requested by a subscriber, the consumer service representative can hear what the subscriber is saying over the telephone, but cannot see what is being displayed on the subscriber's TV screen.

Another important drawback of the prior art system is the manner in which the analog data is distributed from the system to the CATV center and the subscribers. The cost of transmitting data from the host computer to the CATV is expensive and the prior art system makes sub-optimal use of the distribution channel capacity. In the prior art system, the video information is time-multiplexed onto one distribution channel while the audio is frequency-division multiplexed onto another distribution channel. Thus, the CATV headend must allocate two distribution channels to the system. Not only are these channels costly to acquire, but many CATV companies may not have enough channel capacity for all their users, and from a business perspective, may be hesitant to sell more than one channel to a single user.

Finally, the prior art system has problems which are fundamentally related to the storing, copying and transmission of data in analog form. Analog signals are more prone to degradation by noise sources that generally arise in any electronic system. Degradation of analog signals as they are transmitted down the long lengths of coaxial line which comprise the transmission network of the CATV system is inevitable. Additionally, the maximum signal-to-noise of the video signals which are attainable at the output of a video disc player is much lower than the noise figure for studio quality video broadcast. This adds to the degradation in quality of the final video images seen by the subscriber.

SUMMARY OF THE INVENTION

It is an object of the present invention to provide a new and improved digital interactive multimedia presentation and communications system for interactively distributing information to subscribers via television.

It is a further object of the present invention to overcome the deficiencies of the prior art analog system described above, by providing a digital interactive multimedia presentation and communications system in which all relevant data, from inception to final presentation, is processed, stored, and distributed in digital form, thereby permitting accurate reproduction of the original signals.

It is another object of this invention to provide for a digital interactive multimedia presentation and communications system which is considerably more cost effective and physically smaller in size than the prior art analog system described above.

It is yet another object of this invention to provide for a digital interactive multimedia presentation and communications system which responds rapidly to a subscriber's input, and which does not impose severe constraints on the length of audio information which can be transmitted.

It is still another object of the invention to provide for a digital interactive system in which commercial clients have a facility whereby their presentations may be rapidly produced and stored in digital form, thereby obviating the cumbersome premastering and duplication procedure necessary in the prior art analog system.

Another object of this invention is to provide a digital interactive presentation and communications system in which digital mass storage is used for storing and retrieving all relevant data, thereby obviating the need to prepare masters and multiple copies of video discs, as required in the prior art.

It is an additional object of this invention to provide a digital interactive system which more efficiently utilizes the full bandwidth of the telephone connections, so that an inexpensive telephone link can be maintained between subscribers and the system.

A further object of this invention is to provide a digital interactive system wherein appropriate feedback indications are rapidly transmitted between the system and the subscriber, to confirm the integrity of the data transmissions on both ends.

Yet another object of this invention is to provide a digital interactive system which has the capability of displaying parts of a presentation using motion video.

A still further object of this invention is to provide a digital interactive system wherein the communications connections between all the computer processors which comprise the system are designed to permit rapid data transfer between any two processors within the system.

An additional object of the invention is to provide a data transmission means which more efficiently utilizes the available distribution channel capacity to permit many active subscribers to be concurrently supported by the system, and which only requires one distribution channel for transmission of all data to the subscribers.

It is still another object of the invention to provide a digital interactive system which can be readily expanded to encompass multiple operating centers. Now data can be acquired by an operating center by importing and storing data on demand from other operating centers of the system, thus maintaining a simple and inexpensive systems architecture.

It is yet another object of this invention to provide a digital interactive system wherein presentations may be tailored to particular markets, based upon demographic information about the subscribers which is stored on the system.

In general terms, the present invention is directed to an interactive multimedia presentation and communications system which is accessible to a plurality of subscribers, wherein each subscriber may select a particular multimedia presentation for viewing on his television set that is chosen from a plurality of such presentations available on the system. Each of these presentations generally includes a sequence of video images, accompanying audio, and a menu of choices related to the presentation which appears as a graphics overlay. In response to viewing the presentation, the subscriber may make a selection of one of the choices offered in the menu to either perform transactions related to the presentation, or to select yet another particular presentation for viewing on his television set.

The interactive multimedia presentation and communications system of the present invention comprises a computing means for preparing, storing and processing digital data that is related to and representative of the plurality of multimedia presentations and which can perform various transactions. In response to the subscriber's selections, the computing means can either perform chosen transactions, or can retrieve and process digital data related to a particular multimedia presentation that has been chosen. Input means are available to each of the subscribers for communicating their selections to the computing means. Signal transmission means are provided for transmitting digital data between the computing means and a signal processing means. The signal processing means receives, stores and further processes the digital data that is related to a particular multimedia presentation that has been selected by a subscriber, converts the digital data into analog TV signals and then transmits the analog TV signals to the television set of the subscriber who has selected that particular multimedia presentation.

A preferred embodiment of the present invention is directed to a digital interactive multimedia presentation and communications system in which a subscriber enters codes via a standard Touch-Tone telephone keypad in response to menus, graphics, and audio which are presented on a television screen, and by so doing selects a presentation which comprises video images and audio commentary about particular items that are displayed on the TV screen.

The present invention manipulates, processes and transmits all data destined for a particular subscriber in digital format. In order to reach a subscriber's TV set, the digital data is transmitted from a particular local operating center to the CATV company's headend on a high speed digital link comprising a single distribution channel. Transmission of all the digital audio, video, graphic overlay and control information on a single distribution channel results in efficient use of the channel's capacity. At the CATV headend, the data is block converted onto a CATV distribution frequency, and transmitted to a plurality of field devices which are locally distributed throughout the area serviced by the system. These field devices, known as "presentation players", each have their own identification ("ID") number, and can identify and intercept the digital data addressed to them. When a subscriber requests a particular presentation, the interactive system ensures that the particular digital data required to construct that presentation is transmitted to the subscriber's local presentation player. At this local presentation player, the digital data is transformed into an analog format which is compatible with television transmission and playback. The presentation player then transmits the analog information along a short section of cable between the presentation player and the subscriber's television set. Thus, the data, from the time it is produced by the commercial client until it is received at a presentation player is maintained in digital form, thereby ensuring that the integrity and visual quality of the presentations is far superior to that available in the prior art analog system.

BRIEF DESCRIPTIONS OF THE DRAWINGS

For a fuller understanding of the nature and objects of the invention, reference should be made to the following detailed description, as illustrated in the accompanying drawings wherein.

Figure 6C:
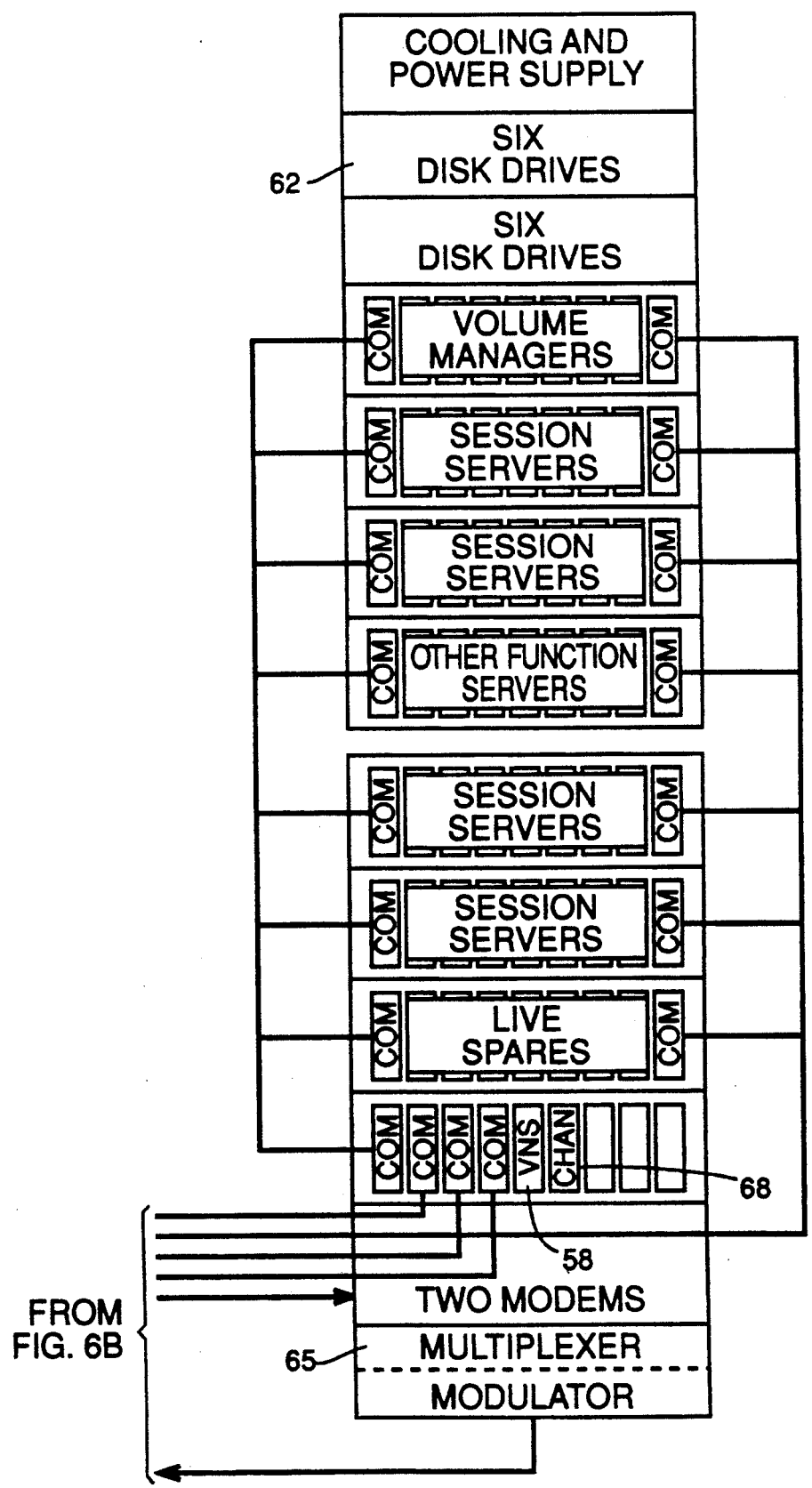

FIGS. 6(A), (B) and (C) illustrate the physical layout of the chassis and peripheral equipment within a small local operating center of the system.

Figure 7:
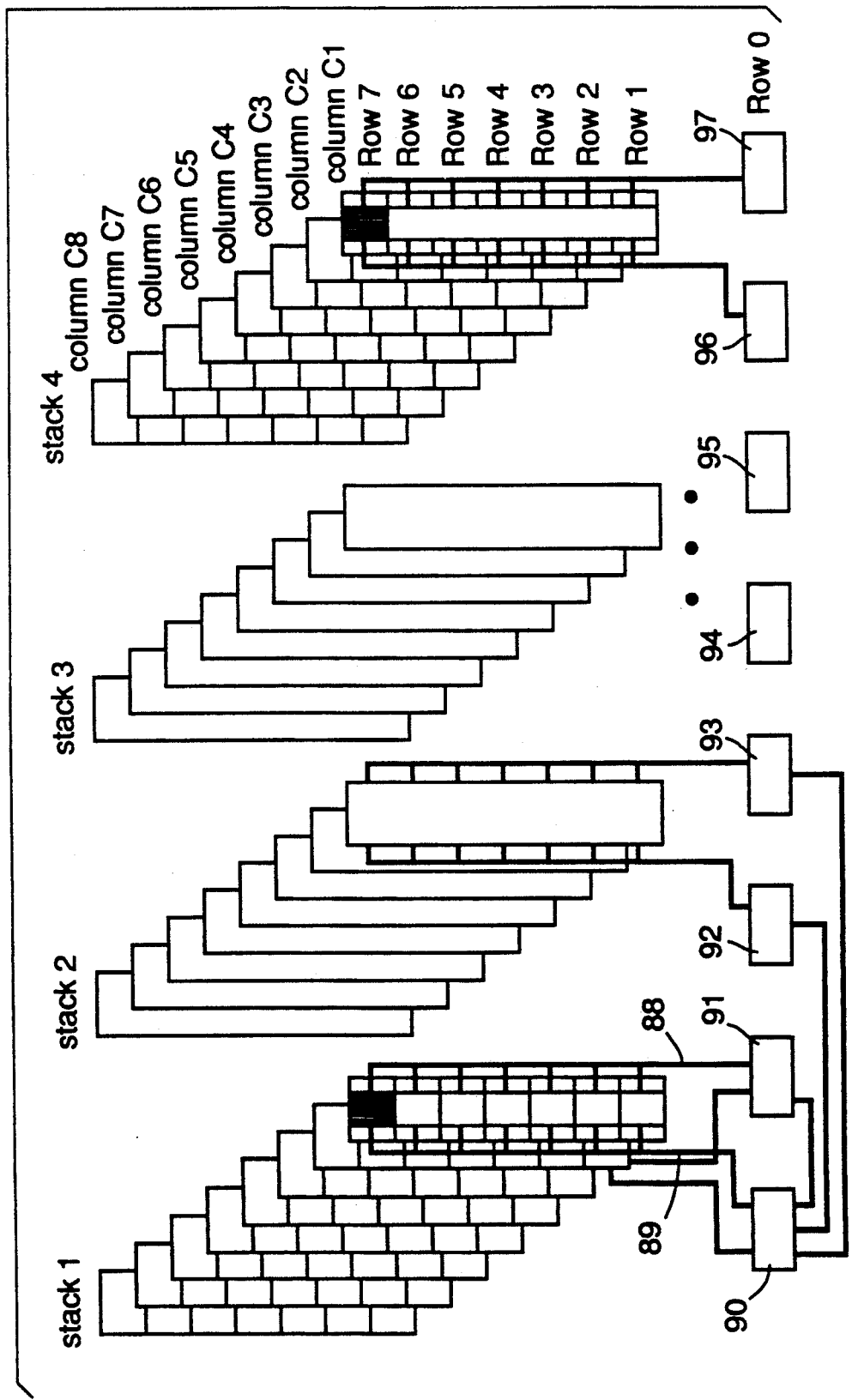

FIG. 7 schematically illustrates an intra-LOC communications scheme, wherein chassis are redundantly interconnected by SCSI buses.

Figure 8:
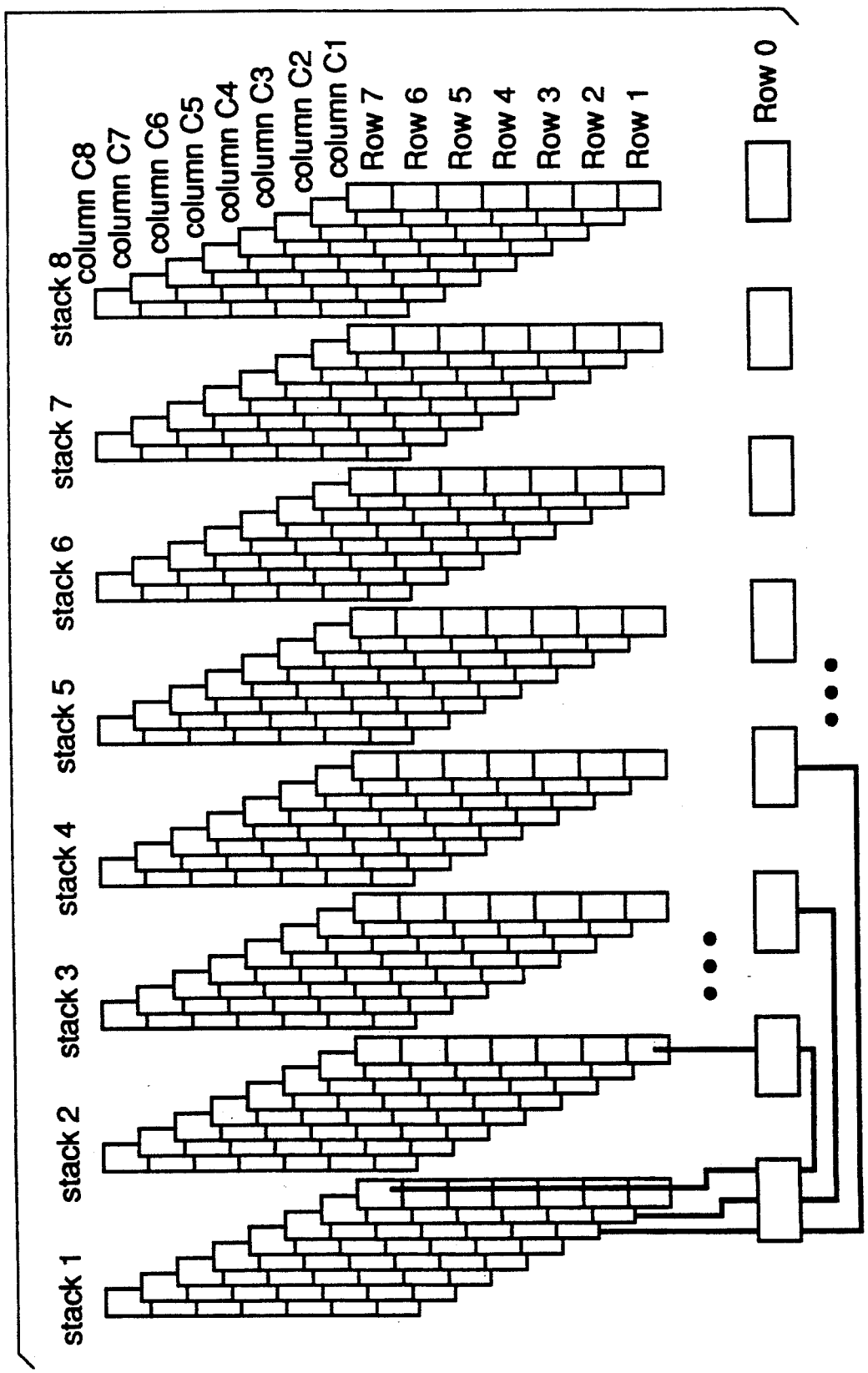

FIG. 8 shows an intra-LOC communications scheme which supports a large number of chassis, without redundancy.

Figure 9:
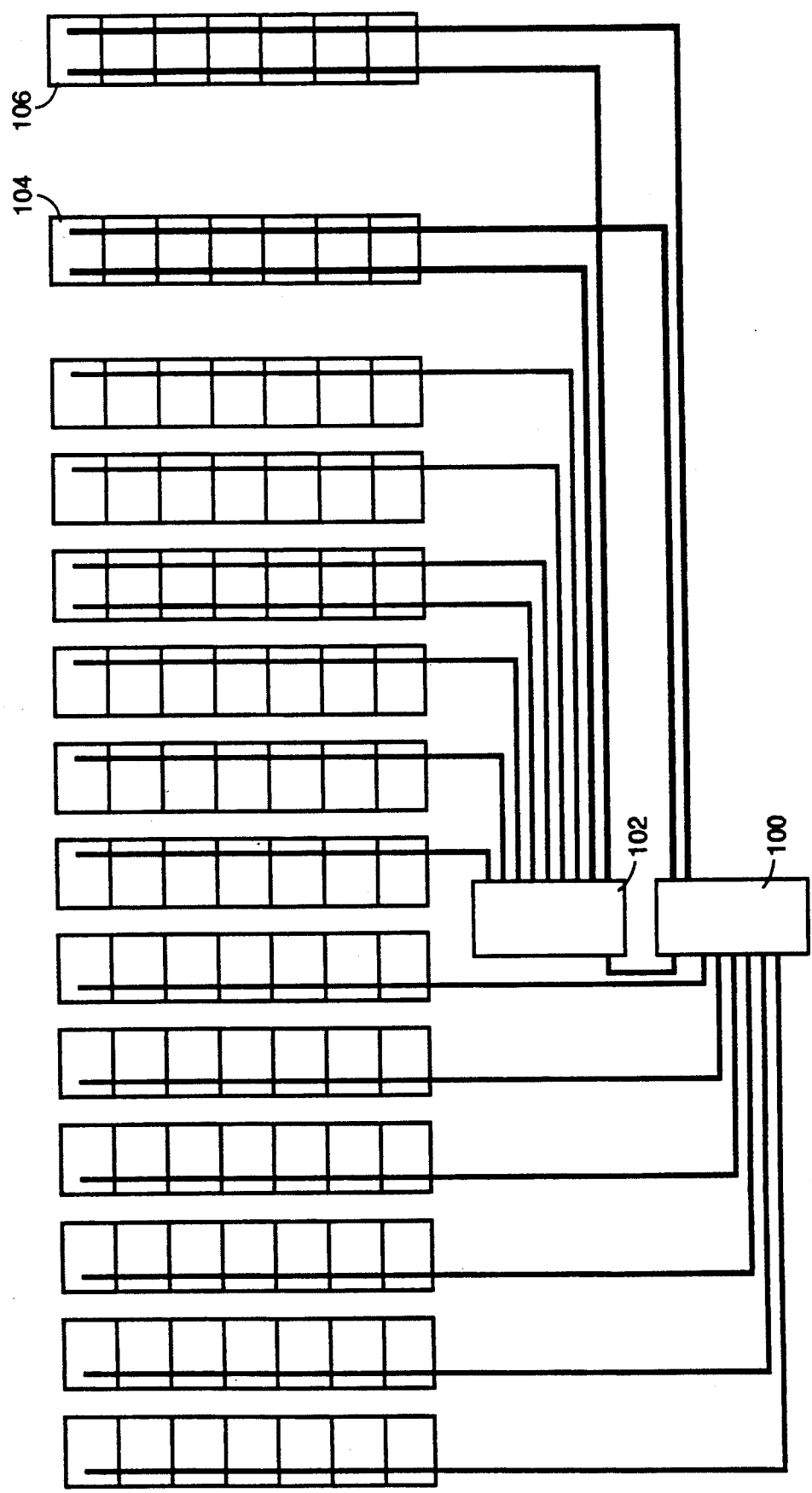

FIG. 9 illustrates an intra-LOC communications scheme designed for a local operating center which can service up to three thousand concurrent subscribers.

Figure 10:
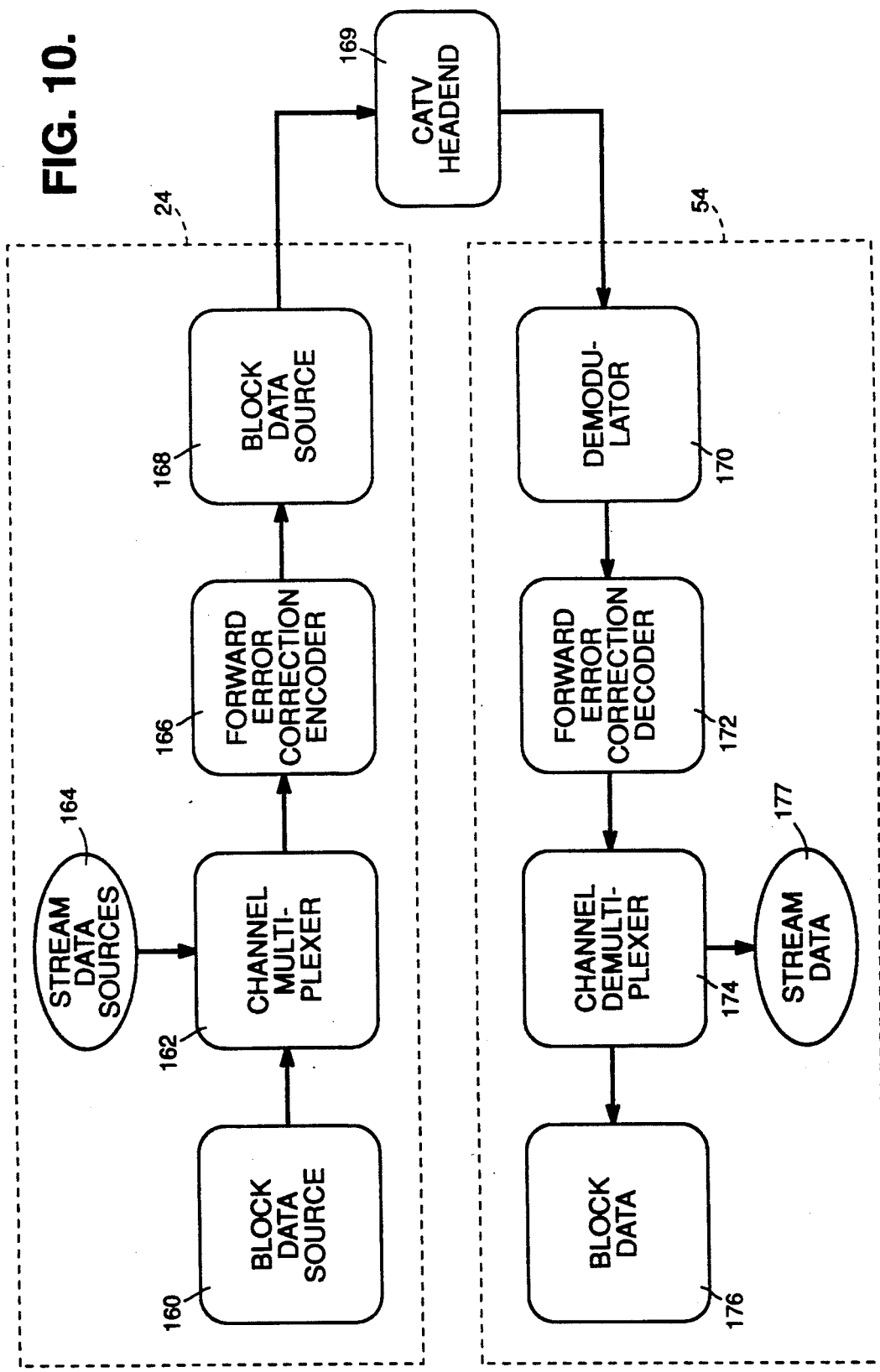

FIG. 10 illustrates, in block format, the typical data flow from the channel, server to the presentation player. More particularly, FIG. 10 schematically illustrates how stream data sources and block data sources are multiplexed prior to transmission to the CATV headend, and how these sources are demultiplexed at the presentation player.

Figure 11:
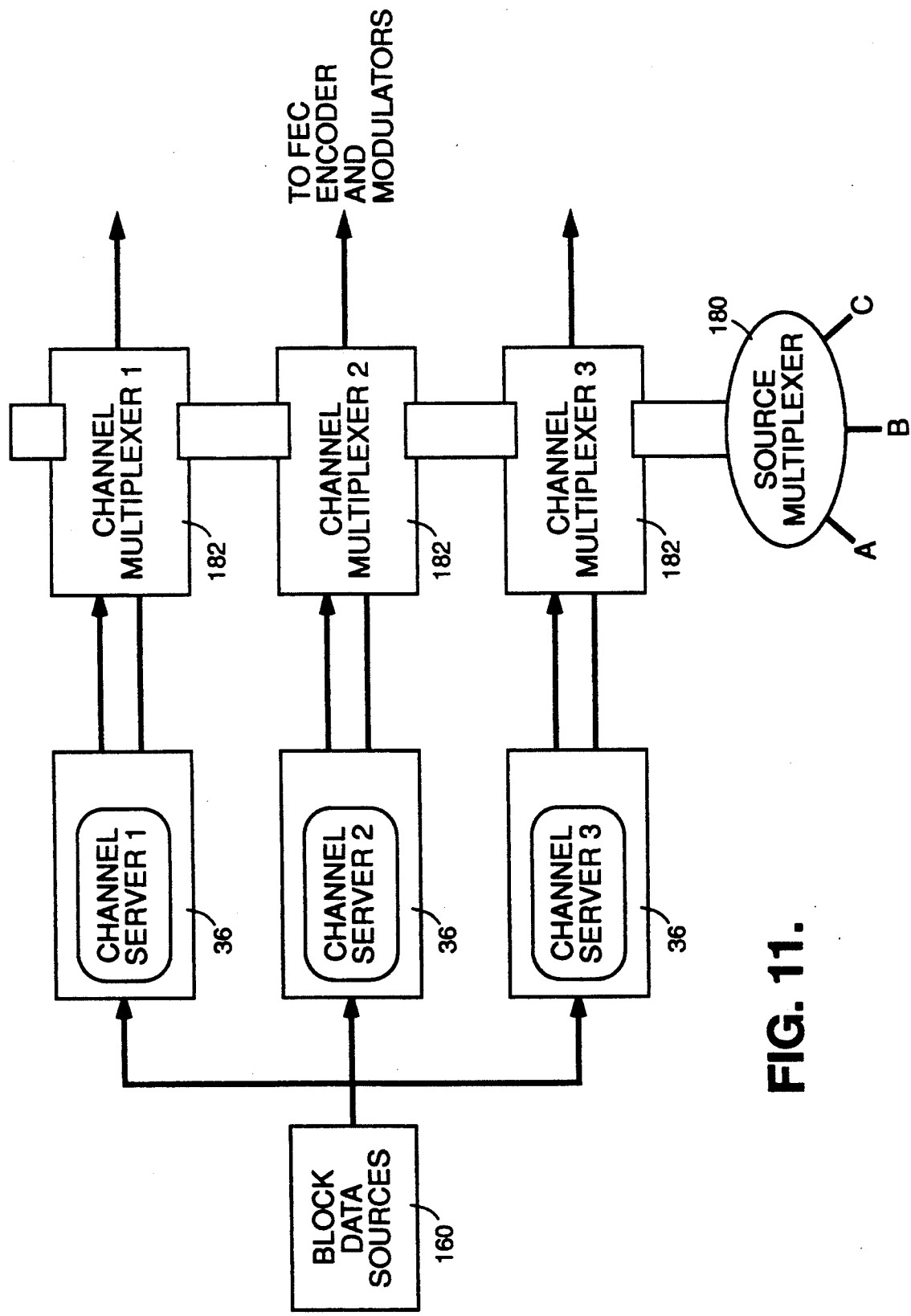

FIG. 11 schematically illustrates the manner in which stream data sources are sequentially passed through the multiplexers, each of which services a plurality of channel servers within the local operating center.

Figure 12:
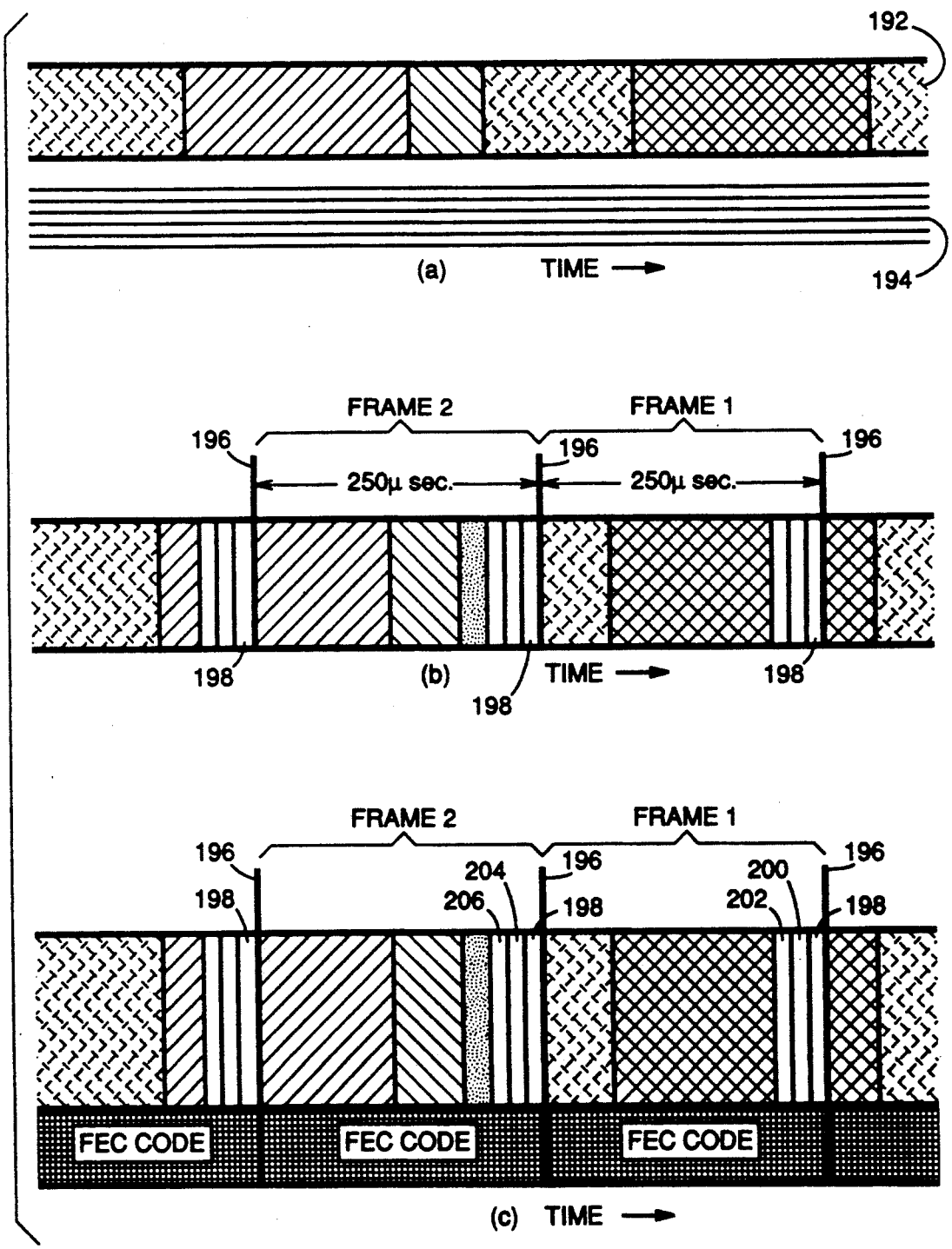

FIG. 12 shows the block data channels and the stream data channels as a function of time, and indicates the framing and multiplexing technique in which stream data channels are interspersed with the block data for transmission along with error correction code to the CATV headend.

Figure 13:
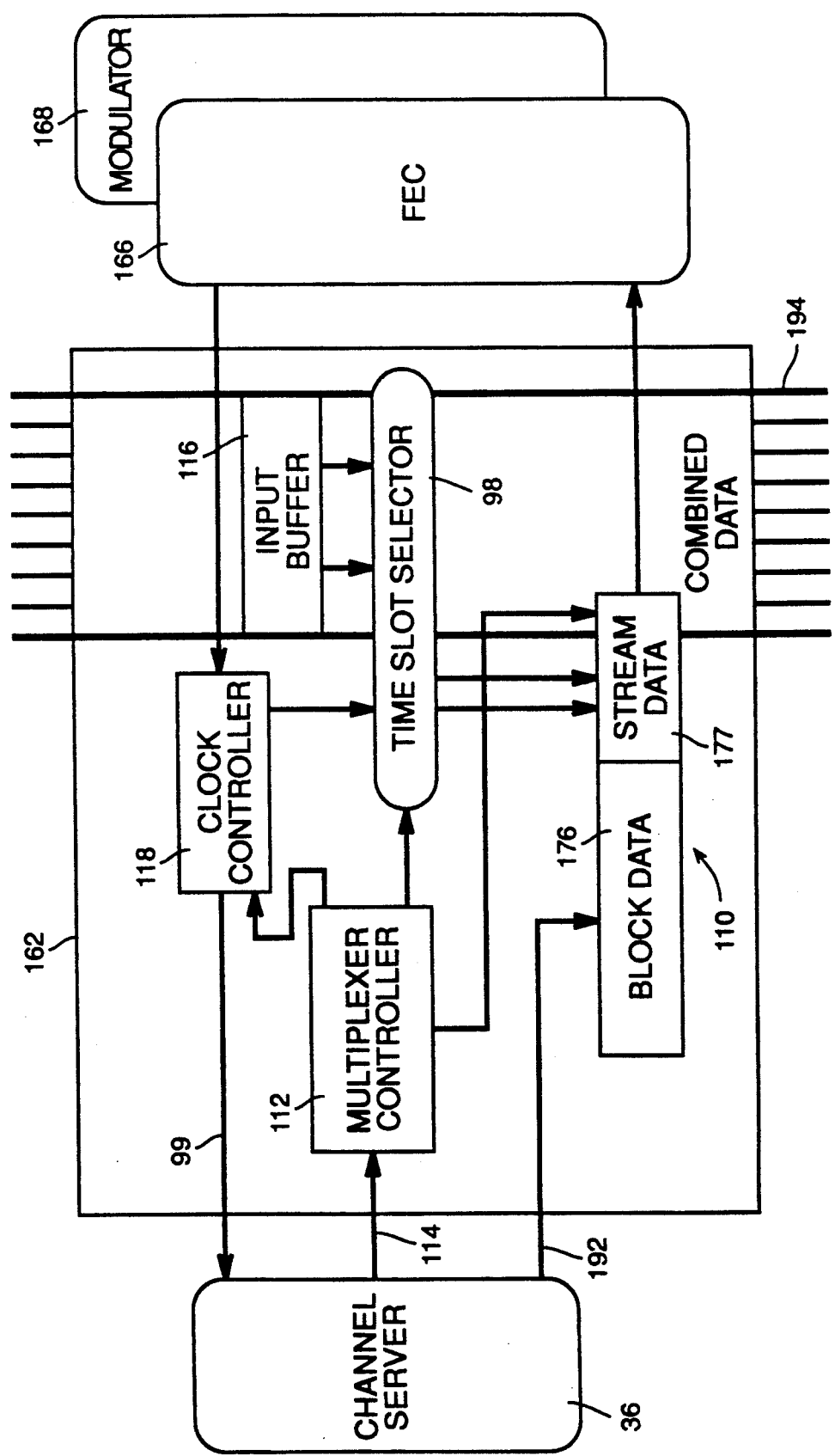

FIG. 13 shows the main functional components of the channel multiplexer in block form.

Figure 14:
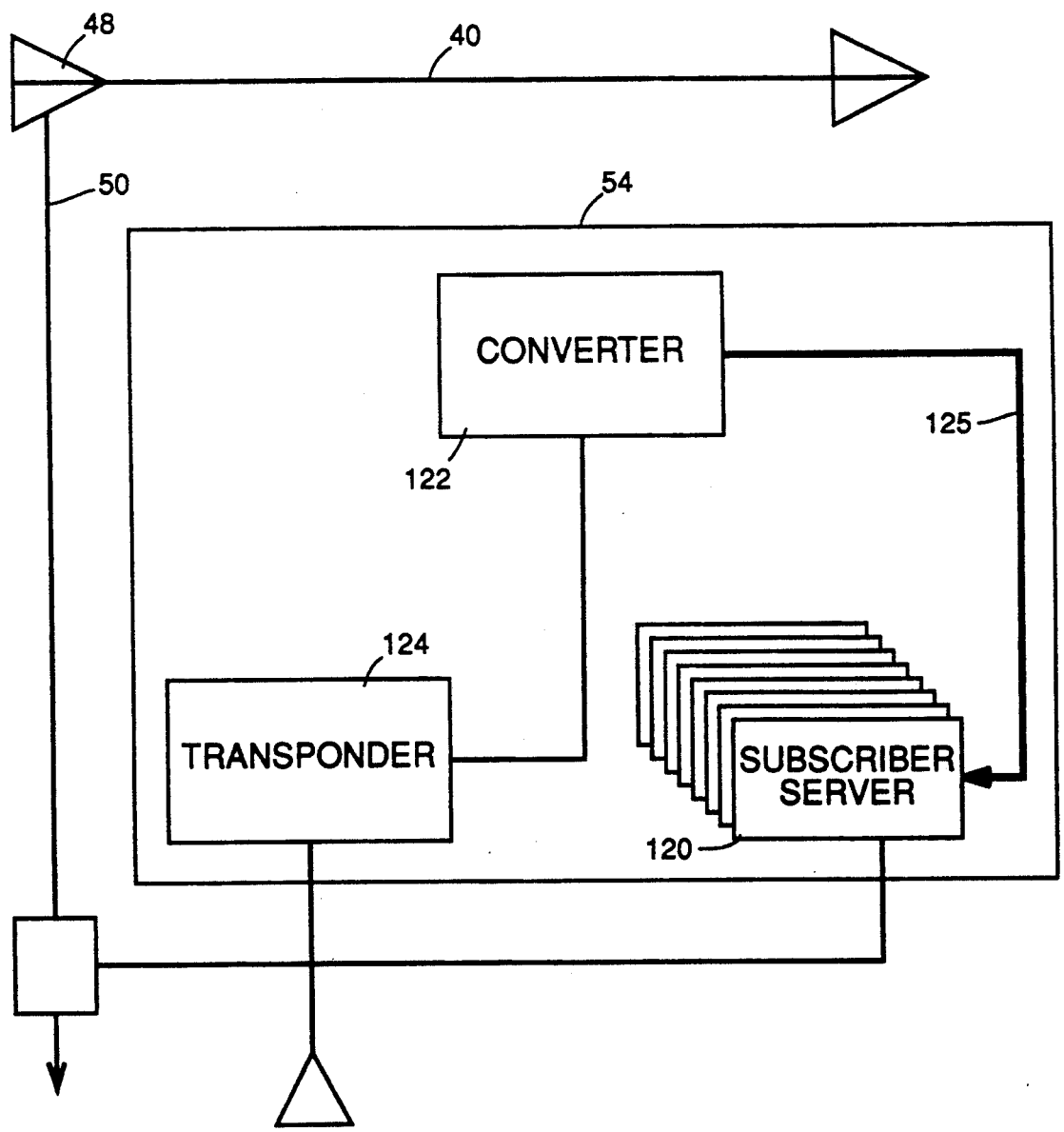

FIG. 14 shows the main functional components of the presentation player.

Figure 15:
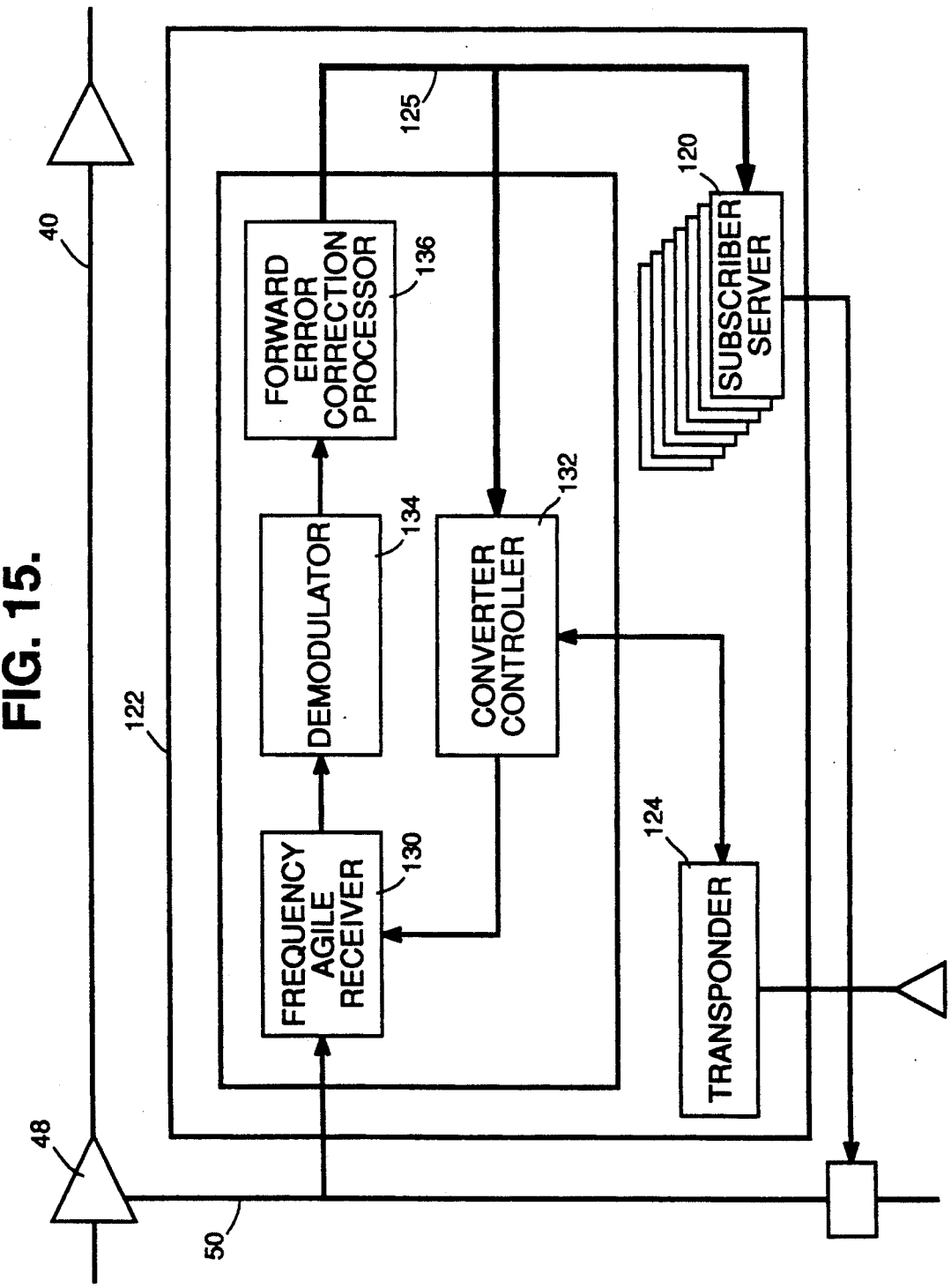

FIG. 15 illustrates, in block form, the components which comprise the converter of the presentation player.

Figure 16:
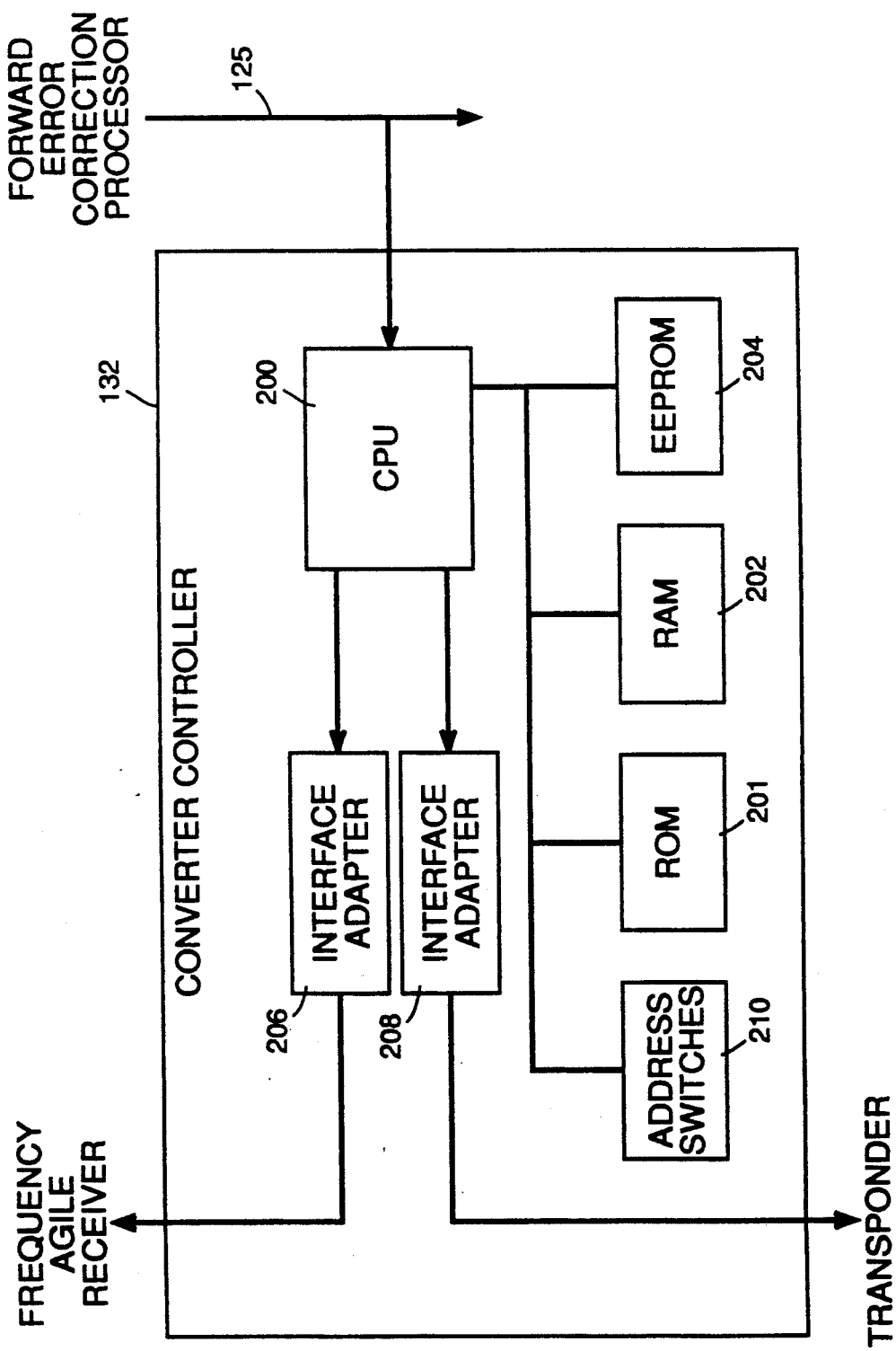

FIG. 16 illustrates, in block form, the main components of the converter controller subsection of the presentation player.

Figure 17:
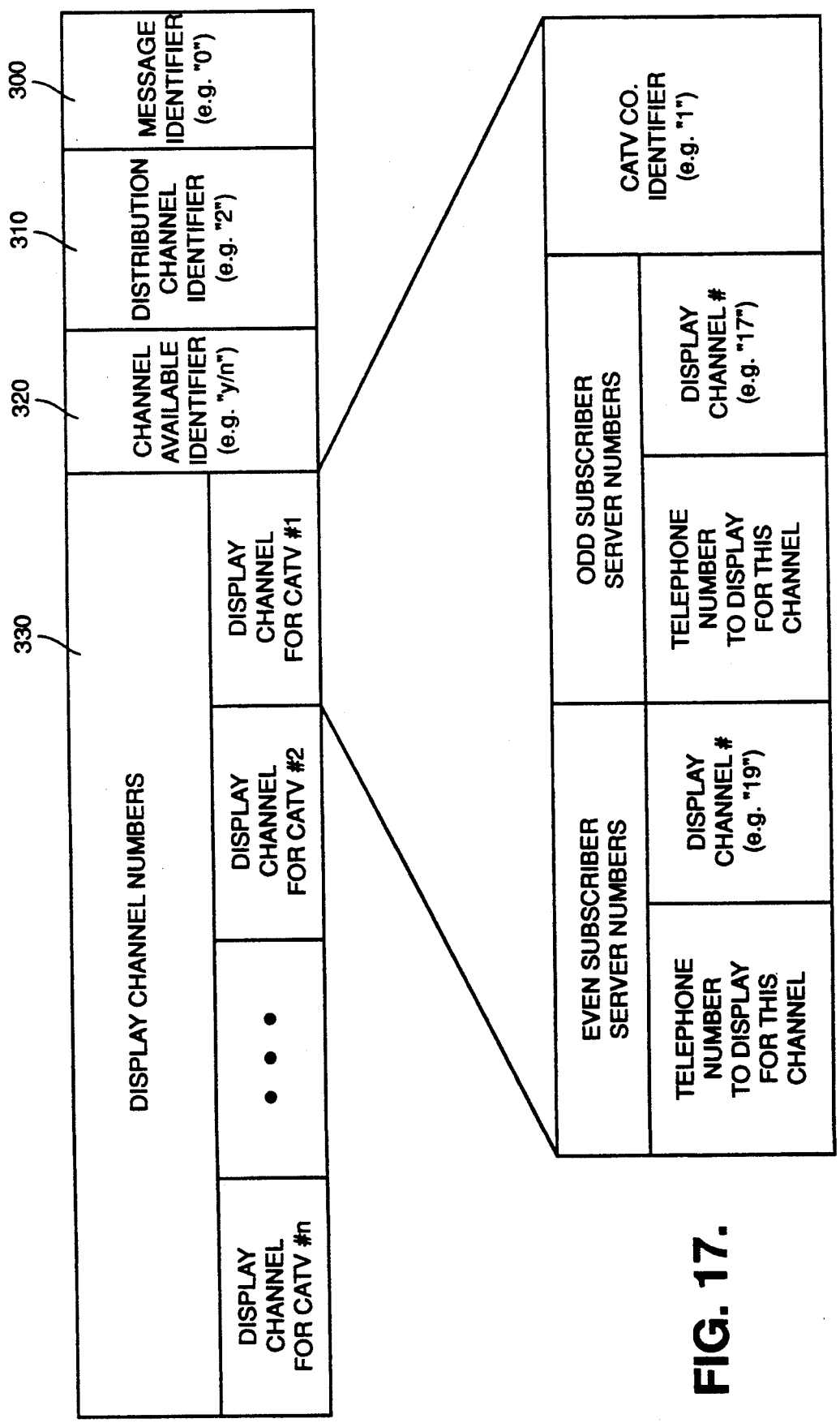

FIG. 17 shows the format of the channel status message that is transmitted, at regular intervals, by a channel server on its distribution channel.

Figure 18:
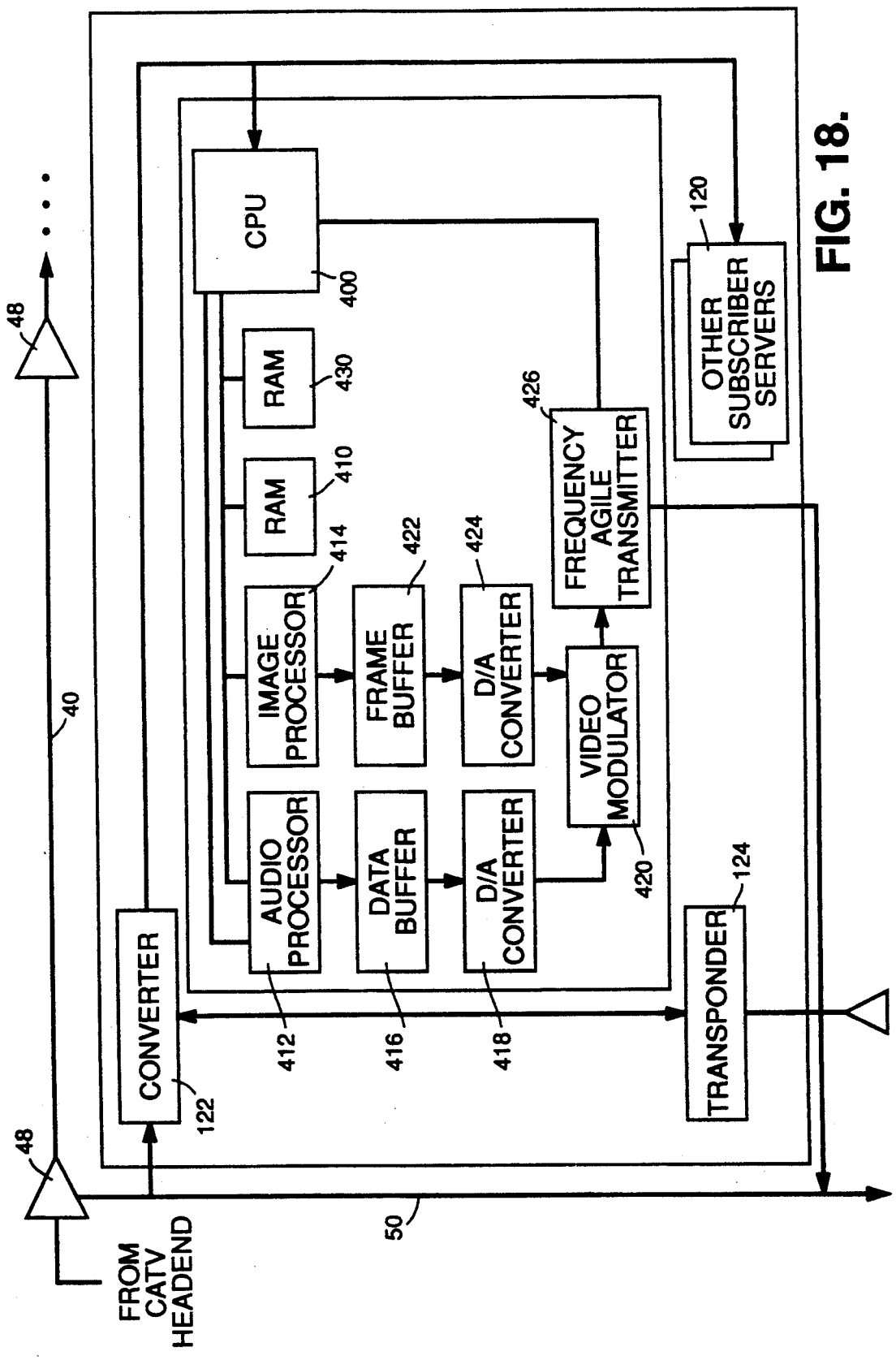

FIG. 18 illustrates, in block form, the main components which are included in each of the subscriber servers that comprise the presentation player.

Figure 19:
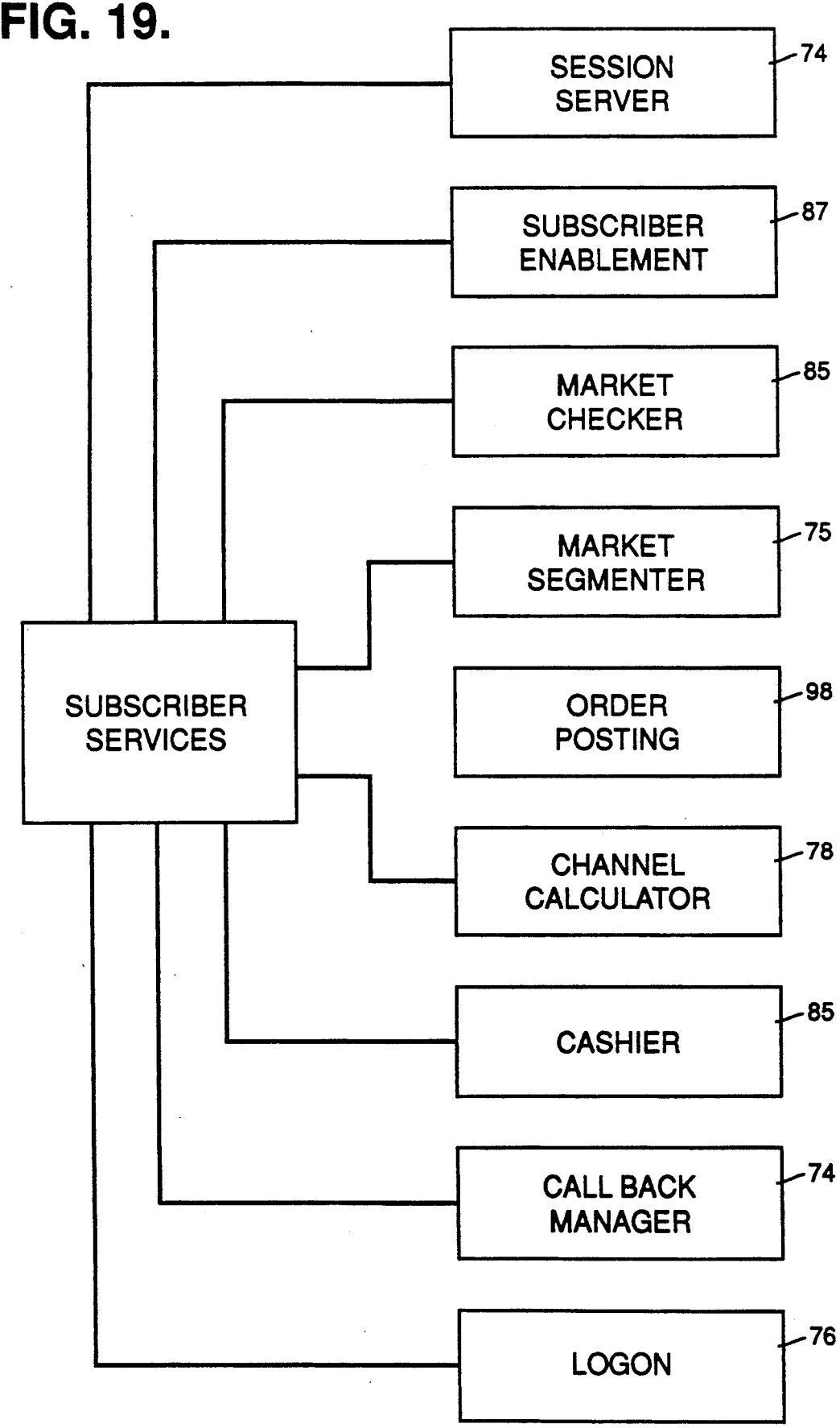

FIG. 19 illustrates, in block diagram form, the various types of subscriber servers that can be incorporated in the digital interactive multimedia presentation and communications system.

Figure 20:
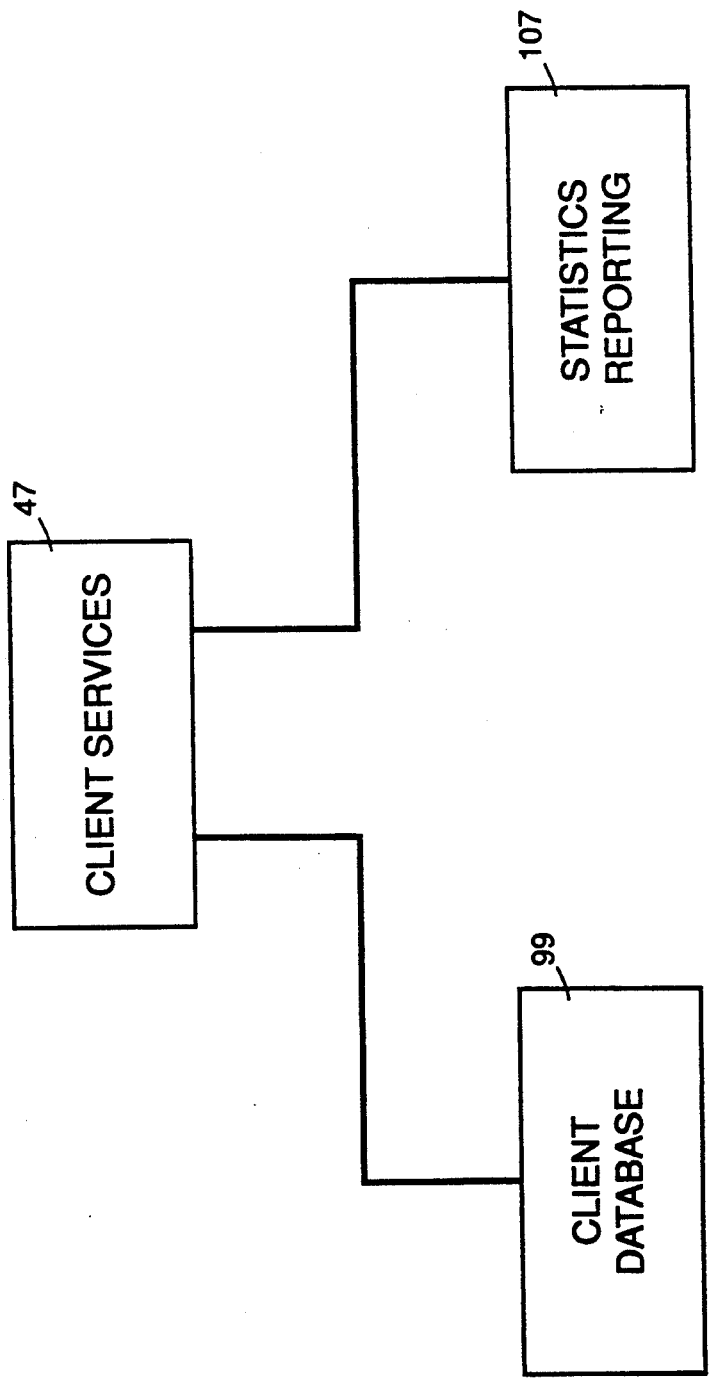

FIG. 20 illustrates, in block diagram form, the various types of client services servers that can be incorporated in the digital interactive multimedia presentation and communications system.

Figure 21:
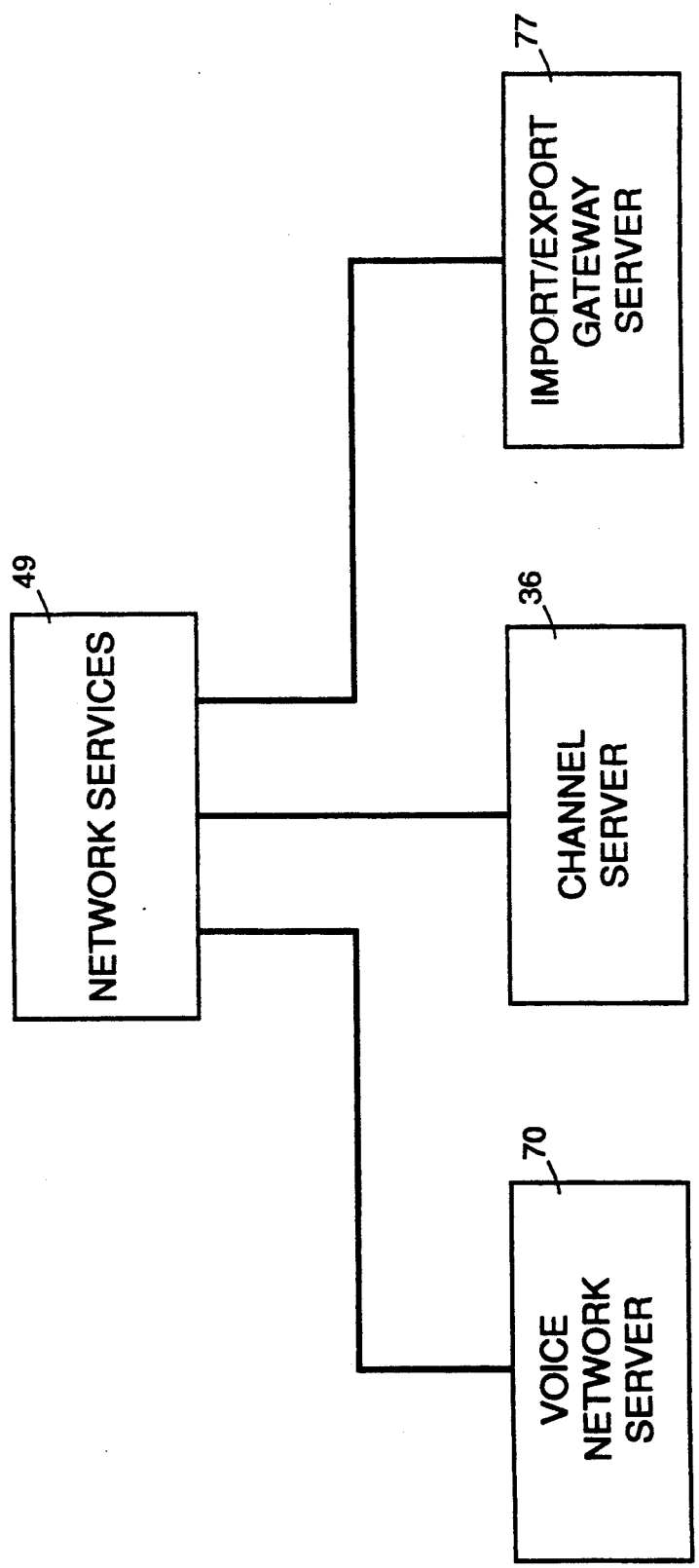

FIG. 21 illustrates, in block diagram form, the various types of network servers that can be incorporated in the digital interactive multimedia presentation and communications system.

Figure 22:
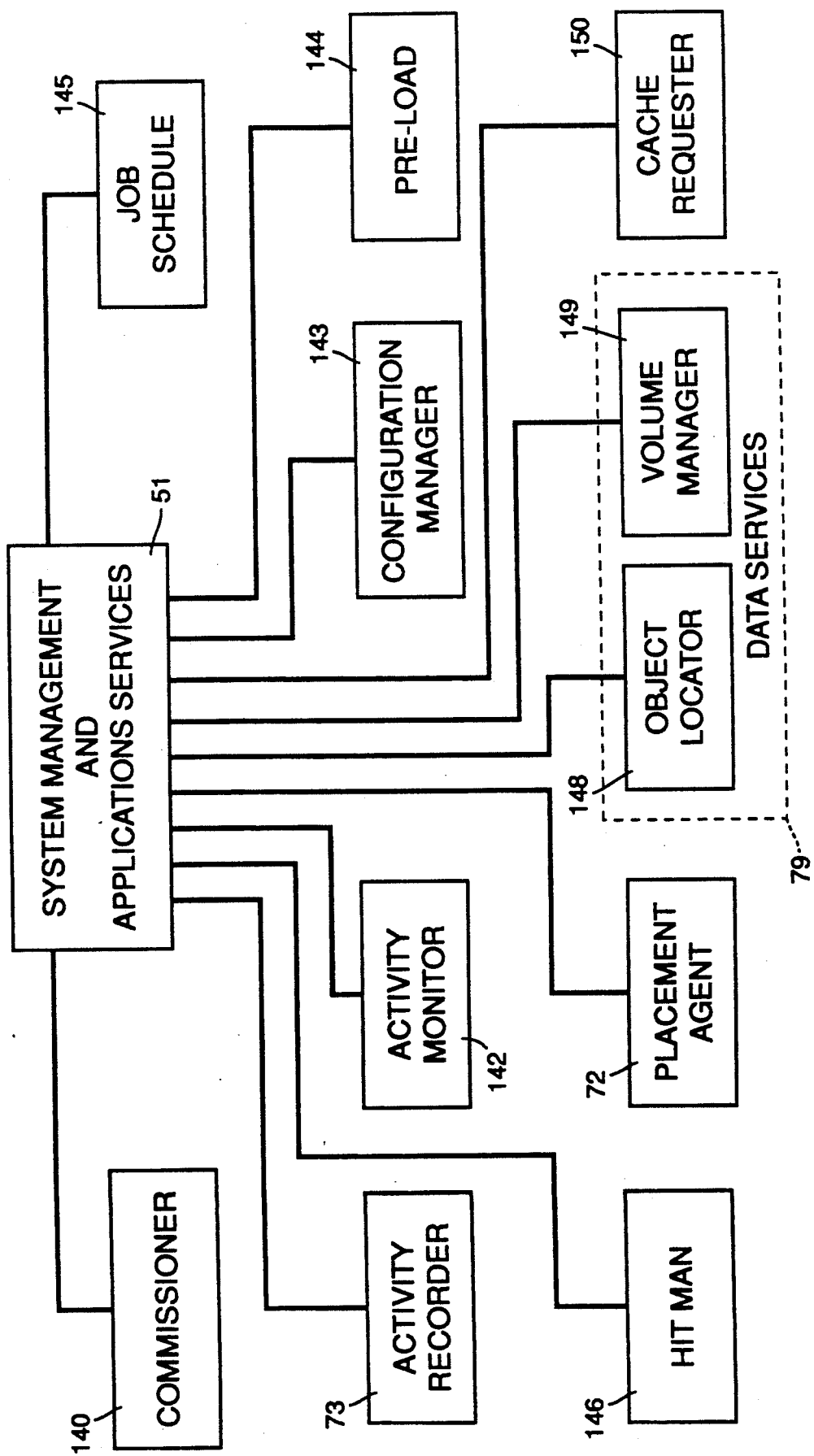

FIG. 22 illustrates, in block diagram form, the various types of systems management and applications servers that can be incorporated in the digital interactive multimedia presentation and communications system.

DESCRIPTION OF A PREFERRED EMBODIMENT

It is helpful at this point to define some particular terms used in this disclosure which relate to the presently preferred embodiment of the interactive multimedia presentation and communications system.

1. Data Object: A data object represents the essential unit of information used by the system, and is a generic term for any string of data. The data object string generally includes structural information about itself (e.g. its length and what type of object it is). The largest data objects stored by the system are compressed video images, which may be 20,000–80,000 bytes in length. Keystroke echo characters, sent to the subscriber's TV screen to provide visual feedback of the subscriber's keystroke entries are examples of small data objects, typically only several bytes in length. Other data objects may contain audio data, processing information, e.g. instructions for generating graphics overlays, etc.

2. Script: A script is a data object, generally of several hundred to several thousand bytes in length, which contains information that defines the time sequence for the display of particular video images and audio accompaniment which constitute a presentation. The script is used to not only determine when and for how long video images and audio will be displayed, but also what graphics or text will be overlaid onto the video images. The information in the scripts is utilized to structure a presentation.

The digital interactive system of the present invention, when configured and operated as an electronic shopping system, electronically simulates many aspects of "live" shopping in a mall. Moreover, a number of interesting features not possible in "live" shopping excursions are also provided. For example, the digital interactive system of the present invention permits a commercial client who displays his goods or services in the "electronic" mall to select his viewing audience based upon demographic data which is stored in the system. The demographic data may consist of information which is readily available, e.g. the postal zip code of a subscriber, or may consist of information which the subscriber has volunteered during his initial log-on to the system. Such information may include data of a more personal nature such as ethnic background, earnings capacity, particular interests and hobbies, etc.

This customized "market segment" approach to shopping is useful both to the commercial clients who display their products on the system, and to the subscribers who utilize the system for their shopping. From the perspective of the commercial clients, the market segment capability permits them to tailor and transmit presentations to only that market segment which is believed to be most likely to purchase their products. From the perspective of the subscribers, providing the system with personal data as to hobbies and interests, allows them to view customized presentations which relate to those interests.

The digital interactive system of the present invention is designed to service many subscribers who reside in different geographical locations, and may be incrementally expanded into a nationwide network. A plurality of local operating centers service various geographical localities within a region. These local operating centers are linked to each other, and to a regional operating center, via high speed data communications pathways.

A novel design philosophy incorporated into the digital interactive system of the present invention involves the notion of "storage on demand". This capability is important in establishing a system which can easily expand in size and adapt to changing requirements without burdensome external supervision. When a subscriber requests data from his local operating center, the local operating center checks to see whether the requested data are present in local storage, and if not, requests that the data be imported from other local operating centers to which it is connected. If none of the local operating centers which form the regional network have the data, it is imported from the regional operating center, one of whose functions is to store a full set of data for the entire region.

By storing data upon demand from subscribers, the local operating center is assured of always having the most frequently requested data ready for rapid and inexpensive retrieval. When necessary to free up storage capacity, the least frequently used data is deleted from the local operating center. Thus, the notion of "storage on demand" ensures that data in the local operating centers is dynamically optimized over time to be the most often requested data. This is done with minimal human supervision over the data flow. Moreover, as the system expands geographically, and new local operating centers are established, these new centers can automatically acquire the data to service the local subscribers, as needed.

Easy maintenance and expandability of the system is further assured by a system architecture which embodies the main functionality of the system in a plurality of identical computer processors which operate on an equally ranked basis to provide a powerful and efficient distributed processing capability at each of the operating centers. These processors are loosely coupled to each other in the sense that they communicate with each other to avoid conflicts and share data from a common database, but nevertheless have independently executing processes which establish the environment and provide the different functions required by the system.

Figure 1:
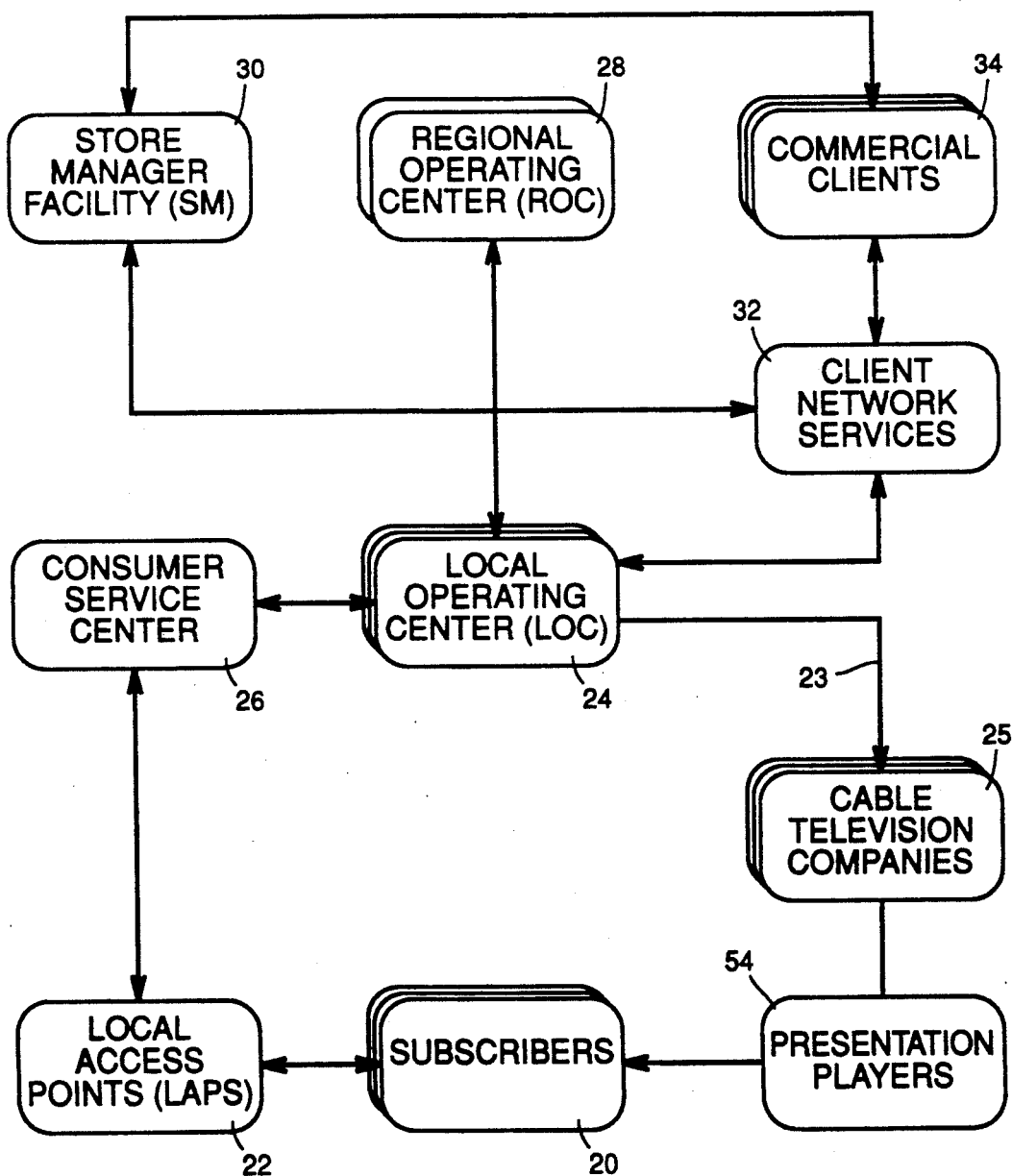
FIG. 1 represents an overview, in schematic form, of the various elements which form the digital interactive multimedia presentation and communications system, and their relationship to each other.

The digital interactive multimedia presentation and communications system ("IMPACS") of the present invention is composed of a number of interrelated functional elements depicted in FIG. 1. With reference to that figure, a subscriber to the system, denoted by reference numeral 20, uses a Touch-Tone telephone to communicate with one of a plurality of local access points ("LAP's") 22, which are geographically distributed throughout the region served by the digital interactive system, and are designed to minimize telephone connection charges. The local access points have facilities which decode the standard Dual-Tone Multi-Frequency ("DTMF") signals generated by Touch-Tone keypads and convert these signals into standard ASCII-formatted data packets which can be more readily interpreted by digital systems. In order to reduce telephone costs, many of these small data packets from different active subscribers 20 are combined for transmission via a modem along a single telephone line to a local operating center ("LOC") 24 of the digital interactive multimedia presentation and communications system. Consequently, the number of long distance telephone lines required, and their attendant costs, are kept to a minimum.

The LAP 22 may also be connected to a consumer service center 26, so that when the occasion arises, subscribers 20 who require help with their shopping may talk over the telephone to a consumer service representative. For example, consider the case where a subscriber 20 is shopping for tickets to a particular concert. The system has displayed a seating chart for the auditorium where the concert will be held, and the subscriber 20 has selected a particular seating section. When the subscriber 20 wishes to purchase a ticket, a telephone bridge may be made automatically between the subscriber 20 and a ticket agent, who will receive the call and provide up-to-date ticket availability information to the would-be ticket purchaser. In a preferred embodiment of this invention, the consumer service representative situated at the consumer service center 26 also has a TV set connected to the system, and sees exactly what the subscriber 20 sees on the TV screen.

Another example illustrating the usefulness of the consumer service center 26 occurs when a new subscriber 20 to the home shopping service dials in and begins using the system. If a formal enrollment procedure has not yet been executed by the subscriber 20, the consumer service center 26 will be automatically bridged to the subscriber 20 via LAP 22 so that a formal sign-up can be made wherein certain demographic and credit card information will be solicited from the subscriber 20.

In addition to providing standard shopping presentations consisting of still-video displays and accompanying audio, the digital interactive multimedia presentation and communications system of the present invention provides for a motion video capability. For example, when assistance from the consumer service center 26 is requested by a subscriber, this capability can be used to provide a more "user-friendly" human interface by showing a "live" video image of the consumer service representative in a corner of the television screen.

The local operating center ("LOC") 24 contains the centralized part of the hardware and software elements which are required to service a local community having from several hundred to several thousand concurrent subscribers actively engaged in individual shopping sessions on the system. Information keyed in by a particular subscriber 20 via a Touch-Tone phone is transmitted by the local access point 22 to the LOC 24. LOC 24 searches its local data base for the appropriate video and audio information that is being requested, and transmits this digital data in modulated analog format and in the appropriate sequence along a distribution channel 23 to one of the cable television companies 25 which services subscriber 20. LOC 24 may be connected to a number of different cable television companies 25 which service different geographical regions. These companies remodulate the distribution channel onto transmission frequencies which they have assigned to the digital interactive multimedia presentation and communications system and thus transmit the data to appropriate presentation players 54 which are distributed in the field to service subscribers 20. As will be more fully described herein, each presentation player 54 accepts the digital data which is addressed to it, and processes the data to produce the final presentation. The presentation player 54 further converts the data into a standard television signal format, and transmits the presentation to the TV set of the particular subscriber who has requested the information.

The local operating center 24 typically has a data storage capacity of up to 0.4 terabytes, depending on what is required to contain the data objects necessary to accommodate subscribers who are serviced by that center. The mix of product presentations stored at a given LOC 24 depends upon what subscribers have requested to see and upon what commercial clients wish to have shown to subscribers based upon the subscribers' demographics. The product presentations as well as product data, customer data and software to operate the LOC 24 are generally stored locally within the LOC 24, but if not available, can be obtained from other interconnected LOC's in the system on demand.

Depending upon the size of the subscriber population being served, the digital interactive multimedia presentation and communications system of the present invention may be configured to have multiple LOC's 24, each LOC 24 serving a particular geographical area, and connected to other LOC's 24 in a hierarchical manner so that shopping presentations which are not available at one particular LOC can be acquired upon demand from other LOC's in the system. The digital interactive multimedia presentation and communications system of the present invention is generally further configured to have a regional operating center ("ROC") 28 to which a multiplicity of local operating centers are connected. Typically, one ROC 28 will service approximately 12 LOC's. ROC 28 is operationally similar to LOC's 24, but has additional data storage to store all the possible presentations that are available within the region. The data storage at such a regional operating center will vary up to approximately one terabyte of storage capacity.

A nationwide system in the United States of approximately 60 LOC's and ROC's would be needed to service approximately 20 million subscribers. This integrated system would be able to service 40,000 subscribers concurrently. It would allow any subscriber to have access within less than one second to any one of approximately 800,000 product presentations locally stored at various LOC's, which would typically consist of ten seconds of audio commentary, three video images, and appropriate background music.

The local operating centers 24 and regional operating centers 28 are interconnected by high speed data transmission gateways so that presentations not available within a particular LOC 24 can be imported from another LOC 24 or ROC 28 and stored in the local operating system without significant transmission delay. A response time of 1.5 seconds is provided for non-local presentations which have to be imported from other LOC's 24 or ROC's 28. As storage capacity at a LOC 24 approaches its limit, the least frequently requested presentations are deleted from the LOC 24. By incorporating this kind of "storage on demand" protocol into the system environment, the system automatically ensures that LOC 24 will contain those presentations which have been requested most recently by subscribers 20 within the local geographical area serviced by the LOC 24. Re-allocation of data is performed dynamically as new presentations are added to the system, so that the optimum mix of presentations is always stored within each LOC 24, with minimal human intervention.

Commercial clients who wish to display their goods and services on the digital interactive multimedia presentation and communications system use the store manager facility ("SM") 30, to prepare pictures, text and audio accompaniment for viewing by subscribers 20. In effect, the store manager facility 30 is a production tool with which commercial clients can construct and maintain the presentations depicting their electronic stores. To meet this need, the store manager facility 30 incorporates computer systems which can capture and manipulate video images and audio segments from materials which may originate in any number of different formats (e.g. photographs, drawings, textual material, compact discs, video tape etc.), add information about the products by appropriate graphics overlays, and tailor an appropriate audio accompaniment. Store manager facility 30 provides the commercial client 34 with a flexible way of combining this information, so that a complete presentation may be easily produced, modified, verified for accuracy, and stored in the LOC 24 for viewing by subscriber 20 without undue delay.

In the preferred embodiment, the store manager facility 30 includes a production facility for preparing presentations which can capture and store images in digital form and perform common manipulations on these images, such as shrinking, stretching, rotating, coloring, etc. The digital image can then be compressed in the store manager facility 30 from 500K bytes to about 40K bytes. In addition, the store manager facility 30 has the capability of adding, deleting and concatenating audio segments. The store manager facility 30 is also used to construct appropriate initial scripts and menus. These initial scripts are finalized during the shopping session by utilizing the subscriber's demographic information which is stored within the LOC 24. When the final presentation is composed, it may be previewed by the commercial client 34 in the same manner as it will appear to the subscribers 20. After verification and approval by the commercial client 34, the script, video images, and audio information representing the complete presentation is transmitted in digital form to the mass storage system of the LOC 24, where it is stored for distribution upon request to subscribers 20.

A client network services facility 32 is provided by the digital interactive multimedia presentation and communications system of the present invention to permit information exchange between the system and the commercial clients 34 who have presentations on the system. The information exchange may include lists of product orders which are delivered from the system to the commercial clients for fulfillment, and associated order acknowledgments transmitted back to LOC 24 from the commercial clients 34. The client network services facility 32 provides a way in which order status information used by the system for servicing customer inquiries may be updated. The information exchange also supplies product availability data requested by subscribers 20, and product information which may be used by the LOC 24 to maintain up-to date product information such as in stock or out of stock conditions. Credit authorization and settlement information for credit card purchasers may also be transmitted via this facility.

The digital interactive multimedia presentation and communications system of the present invention fulfills a number of design philosophies and criteria, aimed at successfully serving all the constituencies which transact business on the system. These business constituents include consumers, who are represented by the cable TV subscribers that use the digital interactive multimedia presentation and communications system; commercial clients, whose goods and services are sold through the system; and the CATV companies who provide access to their cable network, and who permit the presentation players to be installed in the field at various locations on the cable network.

From the consumer's perspective, the system provides a number of distinct advantages over prior art systems which are presently available. The present system provides the consumer with fast response time and positive feedback. The response time in most situations is designed to be less than 0.8 seconds for local transactions. Local transactions are those which require no access to data other than what is stored at the local LOC 24 serving the subscriber 20. Transactions requiring access to a remote center, such as another LOC 24 or ROC 28, may take up to one second longer This time includes approximately 500 milliseconds of propagation delay for satellite transmission. In addition, the subscriber 20 is provided a means for sensing that each of his commands has been received. Input characters corresponding to Touch-Tone input signals may be displayed on the TV screen in a designated location in approximately 100 milliseconds from the time the Touch-Tone key is released. The intent is to provide immediate feedback to the consumer. Erroneous entries can be echoed as a beep, message or other indicator. Further, the architecture of the digital interactive system of the present invention permits a wide breadth of products to be displayed through a friendly and feature-rich user interface, and permits enhanced features to be developed quickly and inexpensively.

The present invention gives commercial clients the ability to design and maintain their "electronic stores" from their own premises. The store manager facility 30 permits the commercial clients to construct, augment, or modify a presentation in such a manner that results can be readily viewed as changes are entered. Further, the present invention has storage means for saving presentation materials in a way which permits these materials to be retrieved, modified, and reactivated at a later date.

From the perspective of the CATV companies, the digital interactive system as a whole, and in particular the presentation players which are installed in field locations near the homes of the subscribers they service, are designed to be installed and maintained in a non-intrusive manner so that normal cable company service is not affected should they fail. As a further aid in servicing, the presentation players incorporate self testing procedures, which they use to diagnose and report their own failures via built-in transponders.

HARDWARE IMPLEMENTATION OF THE MULTIMEDIA PRESENTATION AND COMMUNICATIONS SYSTEM

The innovative architecture of the preferred embodiment of the LOC 24 fulfills the design criteria outlined above. Additionally, the architecture as a whole is capable of being scaled in small increments, i.e. it is possible to add or remove performance capability in an operating LOC 24 a small piece at a time. By adopting the architecture described herein, the LOC 24 is rendered highly fault tolerant, and remains functional after any single point failure and many multi-point failures. The loss of functional capability caused by failures incrementally degrades the overall system performance, and can usually be compensated for by idle equipment resident in LOC 24.

Figure 2:
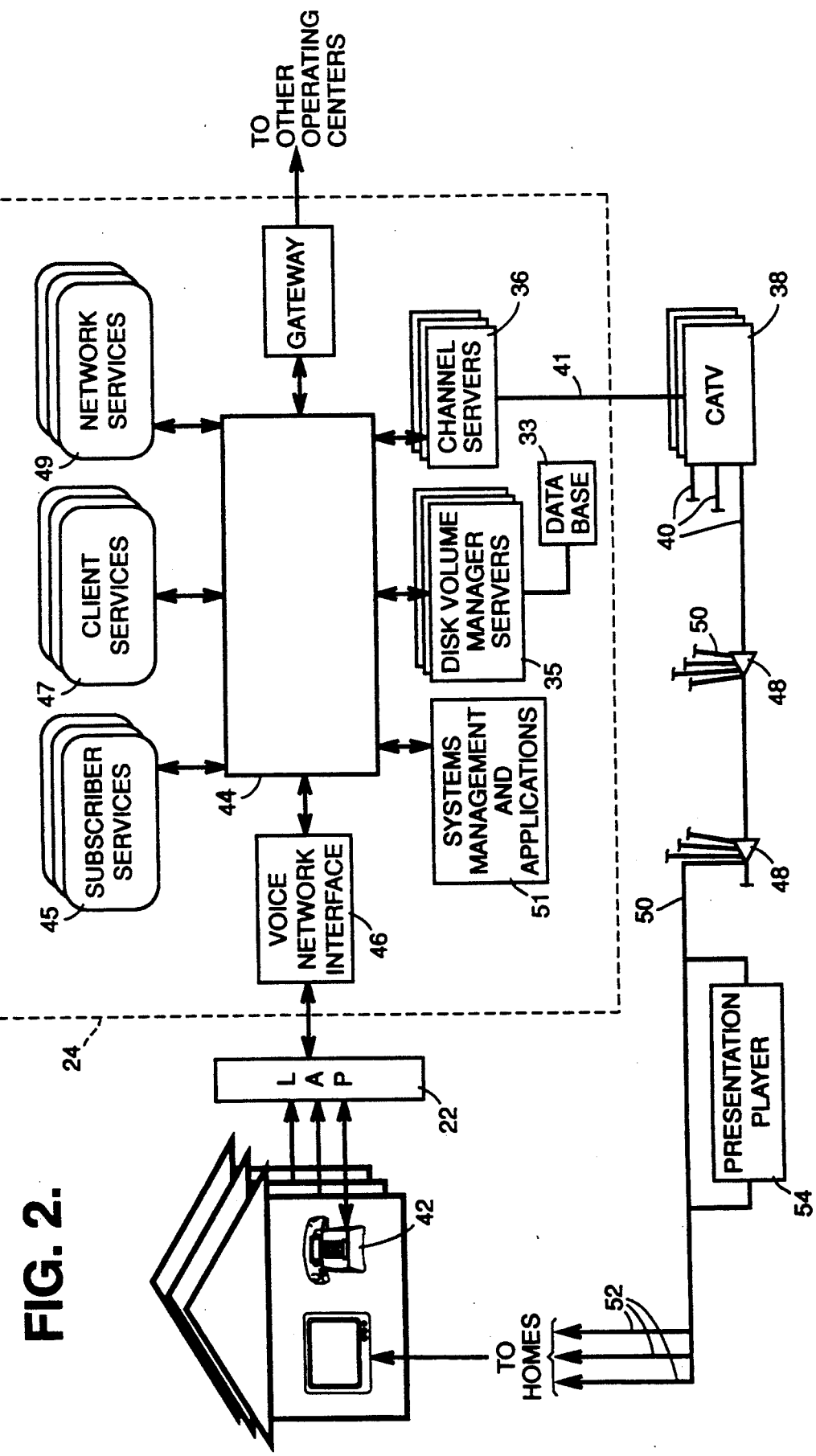
FIG. 2 illustrate a local operating center (LOC) of the digital interactive system, and illustrates the signal pathways between a subscriber, the local operating center, the CATV distribution network, and the presentation player.

The overall architecture of a typical local operating center 24 is schematically depicted in FIG. 2. With reference to that figure, a subscriber 20 uses a Touch-Tone telephone 42 to communicate with the local operating center (LOC) 24. As already described, the signals transmitted from Touch-Tone telephone 42 are carried over conventional telephone lines to a local access point 22, and from there over other telephone lines to the local operating center 24. LOC 24 may be part of a network consisting of a plurality of such LOC's, interconnected so that information may be shared. The LAP 22 transforms Touch-Tone signals into packets of ASCII characters, and then combines the packets from a plurality of other subscribers for transmission via a modem to the voice network interface ("VNI") 46 of the LOC 24. The packets are received by VNI 46, interpreted, and then sent to a high speed data bus 44 which connects all the functional elements of the LOC 24.

LOC 24 is comprised of a plurality of single-board computers ("SBC's") or processors, which are interconnected by the high speed data bus 44, and which support approximately thirty or more different processes that provide the software functions which define the environment of the system. Each single board computer is a fully configured processor having a central processing unit ("CPU"), random access memory ("RAM"), a clock and input/output facilities, and is loaded with specialized software by the system.

The single-board computers comprising the LOC 24 are housed in a plurality of industry standard 20-slot chassis. All of the single-board computers on a chassis communicate with each other through an industry standard Multibus II system bus, which is provided on the chassis backplane. An industry standard Small Computer System Interface ("SCSI") link, whose specific chassis interconnect architecture will be described more fully below, provides the communications link between different chassis of the system. In a preferred embodiment of the invention, the single-board computers communicate via the combination of SCSI and Multibus II links to each other at transmission speeds of at least four million bytes per second. The smallest practical local operating center 24 generally accommodates about 40 concurrent subscribers who require about 100 processes. A more typical LOC 24 comprises approximately 100 20-slot chassis, and supports up to 3000 concurrent subscribers requiring about 4000 processes.

Figure 3:
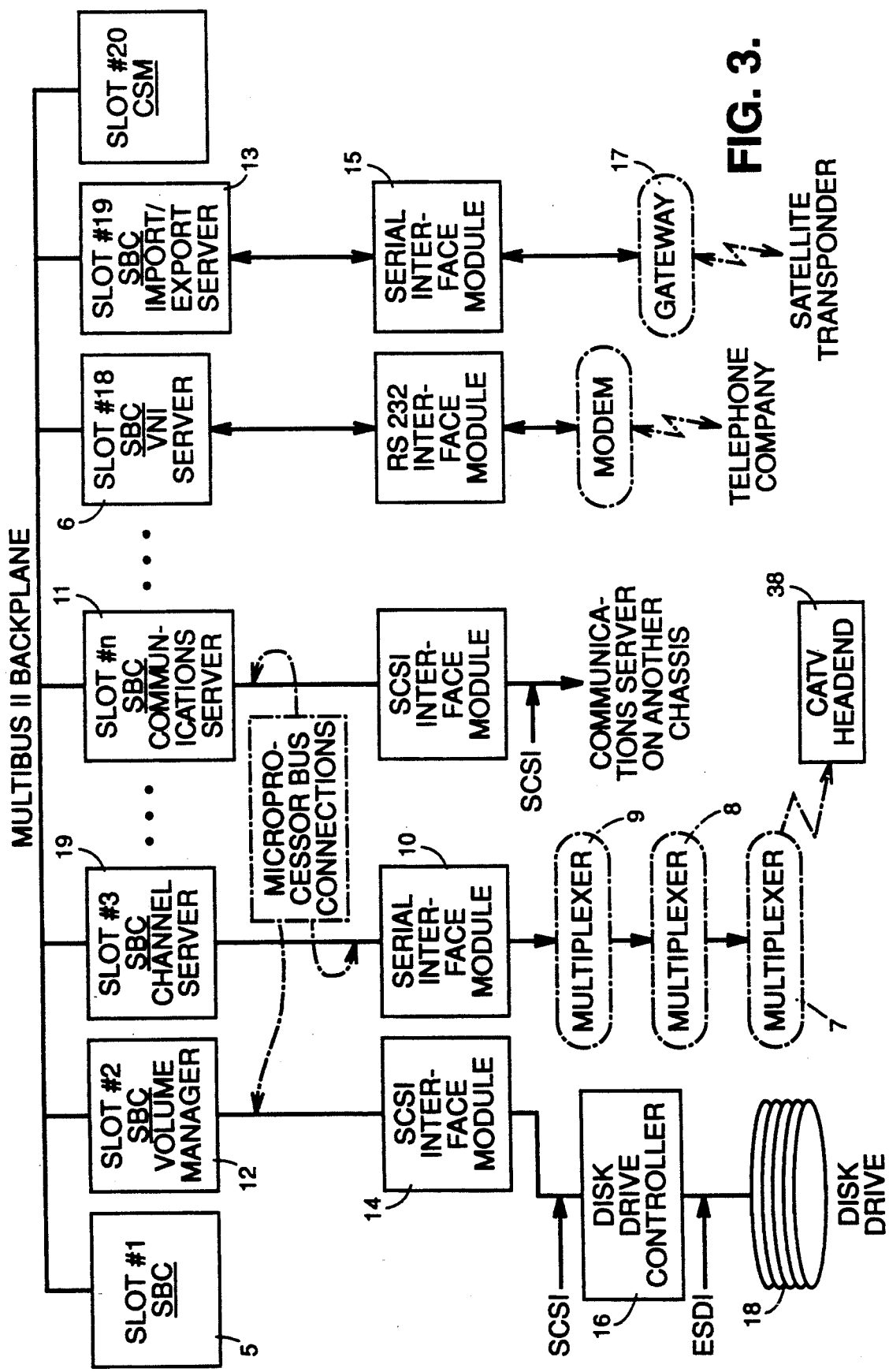
FIG. 3 shows, in block diagram form, a 20-slot chassis which holds the single board computers that comprise the local operating center. The different types of peripherals which connect to some of these single board computers are specifically illustrated.

Although all the SBC's comprising the LOC 24 are physically identical processors, some of the SBC's have different peripherals connected to them via industry standard interfaces. FIG. 3 shows a representative layout of a single chassis, and more clearly illustrates the different peripherals that may be connected to some of the SBC's. As indicated in FIG. 3, the Multibus II backplane of the chassis can accommodate twenty individual slots. Nineteen of these slots may be filled with single-board computers. The twentieth slot contains a central services module ("SCM") which performs housekeeping functions for the chassis, and which is a required component in the Multibus II system. In particular, some single board computers, such as SBC 12 in slot #2 (in the example illustrated by FIG. 3), are connected via the SCSI interface module 14 to a disk drive controller 16, which is in turn connected to a high capacity disk drive 18 via an industry standard Enhanced Small Disk Interface ("ESDI") connection. A plurality of disk drives such as disk drive 18, connected as in the foregoing sentence, comprise the local data base of the LOC 24. The SBC's which have these peripherals act as "volume managers" to control the reading and writing of data to and from the data base. Other SBC's which may be allocated the role of communications devices (or communications servers), as exemplified in FIG. 3 by SBC 11 in slot #n, generally have a high speed SCSI interface link as shown, which connects to other communications servers on other chassis of the system. Likewise, SBC's which act as gateways to provide communications with other LOC's or ROC's will generally be connected as shown in slot #19 of FIG. 3, wherein SBC 13 is provided with a serial interface module 15 for communication with a gateway device 17 to a satellite transponder or other communications pathway. In order to transfer data from the LOC to the distribution channel of the CATV headend, certain SBC's, such as SBC 19 in slot #3 of FIG. 3, are provided with additional hardware that perform the multiplexing of various types of data prior to transmission onto a distribution channel. In particular, SBC 19 is provided with a serial interface module 10, which transfers data to a multiplexer 9, and from there to a modulator 8, and a transmitter 7, from which the data is distributed to the CATV headend 38. The particular reasons and method for performing the multiplexing will be more fully described below. Finally, SBC's which may be called upon to provide the functionality of a voice network interface, are provided with an appropriate modem connection through an industry standard RS232 interface, so that data may be transmitted along telephone lines. This particular peripheral connection is illustrated for SBC 6 of slot #18 in FIG. 3. Slot #1 of FIG. 3 illustrates an SBC 5 which has no peripherals connected to it. This SBC would be chosen to run processes which do not require external peripherals.

Apart from the different peripherals which may be attached to some SBC's, all the SBC's in the system are identical units. Depending upon the particular demands of the system at any point in time, they may be allocated any software task, provided that they have appropriate peripherals to satisfy that task. This architecture permits the system to dynamically reconfigure the mix of processes which are distributed among the SBC's so that system performance is always optimized in response to the varying demands placed on the system as a function of time.

If enough memory or other computing resources are available, any single board computer may be called upon to perform more than one concurrent process. The existence of more than one process on an SBC is transparent to most other processes in the system. A loose coupling exists in the sense that any process sending a message to another does so in a uniform manner, but without knowledge of whether the receiving process is on the same processor, or on another processor located elsewhere in the system. An example of a single-board computer which meets the operating requirements of LOC 24 is Model Number ISBC 386/100 computer manufactured by Intel Corporation of Santa Clara, Calif.

In the present context, a process is a continuously executing program which has sufficient resources allocated to it to accomplish its task, and is generally referred to as a "server". Some of the various categories of servers typically implemented in the LOC 24 to establish the environment of an electronic shopping mall are denoted in FIG. 2 as subscriber services 45, client services 47, network services 49, and systems management and applications 51. The specific servers which comprise these categories are more fully described below.

Two servers in particular are explicitly depicted in FIG. 2. The channel servers 36 are part of the group of network services 49, and provide an interface between LOC 24 and the CATV headends 38 of the cable television companies that are connected to the LOC 24. Each channel server 36 receives digital video, audio and control information which is destined to particular subscribers served by the channel server's 36 distribution channel 41. Each channel server 36 supports a single distribution channel 41 which comprises a high speed digital pathway for transmitting this information on a baseband frequency to the CATV headend 38 to which the channel server is connected. An LOC 24 may typically support between 1 and 16 CATV distribution channels 41, with each distribution channel being served by one channel server process. The process itself, as described above, may be physically distributed over more than one SBC.

Each CATV headend 38 modulates the data onto a particular distribution frequency for transmission through the cable television network. Trunk lines 40 emanate from each CATV headend 38 and constitute the primary distribution paths. At prescribed positions along each trunk line, generally corresponding to distances which result in a signal attenuation of 22 db, are bridge amplifiers 48 which boost the signals to compensate for this attenuation. Secondary distribution feeder cables 50 emanate from the bridge amplifiers 48. Along these secondary distribution feeder cables are taps where the signals are split off to supply approximately 40 homes via drop cables 52, each of which terminates at a particular home. Presentation players 54 are generally located in the field adjacent to bridge amplifiers 48, and are positioned in parallel with the secondary feeder cables 50.

The digital data containing the video and audio presentations is addressed to a specific presentation player 54 which is connected via drop cable 52 to the television set of the subscriber who has requested the information. Each presentation player 54 receives the modulated digital data from the CATV headend 38, converts the data into video and audio presentations having the appropriate television signal format and transmits the particular presentations that have been requested by a subscriber on a predetermined display channel frequency to which the subscriber's television is tuned. Up to 500 presentation players 54 may have active sessions at any one time on a given CATV distribution channel 41 served by LOC 24. The distribution of presentation data to all these presentation players 54 is handled by one channel server process 36.

The second server explicitly shown in FIG. 2 is the disk volume manager server 35. SBC's which are attached to disk drive peripherals may function as volume managers 35. The plurality of disk drives serves as the storage means for storing all the digital data in the LOC 24, and as such constitute a repository for all the presentations and other data objects stored in the LOC 24. The plurality of disk drives thus establishes the data base 33 for the LOC 24. The basic building block of the data base 33 is a disk storage volume, which comprises a disk drive unit such as the Maxtor 760 megabyte device, a controller for the disk drive unit, and a single board computer which acts as the disk volume manager 35. As will be more fully described below, the disk volume managers 35 have the function of storing, retrieving and deleting data objects. Further, each disk volume manager 35 also stores a record of the object name index of its associated disk storage volume for retrieval and recovery purposes.

SOFTWARE IMPLEMENTATION OF THE INTERACTIVE MULTIMEDIA PRESENTATION AND COMMUNICATIONS SYSTEM

As referred to above, the software functions which provide the environment for the digital interactive multimedia presentation and communications system are continually executing processes or "servers" which are dynamically distributed as needed among the single board computers which comprise the local operating center. The functions provided by these servers define the system and provide appropriate interfaces both for subscribers and commercial clients. In addition, the servers provide the capabilities required for systems management and applications, consumer services, and overall network supervision. An overview of some of the various servers and the different functions which they provide is now presented to illustrate one way in which the system may operate. The servers are broadly characterized into categories of subscriber services, client services, and network services. The context of an electronic mall is again chosen as a specific embodiment of the system, although it will be clear to a person skilled in the art that other applications having different contexts are possible.

Within the context of an electronic mall, it is useful to view each position within the mall to which a subscriber may possibly navigate, as consituting a "node" of the system. Each node has a unique appearance and structure. The appearance of the node constitutes what the subscriber is being shown and told at that point of his shopping excursion. The underlying structure of the node is represented by data which enable a particular subscriber to make particular choices. For example, the node may contain structural data which denote the particular markets that are available to the subscriber, based on his demographic information, and the choices available to the subscriber may be accordingly limited to only those markets.

As the subscriber navigates to different nodes of the system, an automatic look-ahead is performed, and the next set of possible nodes to which the subscriber may navigate is obtained. The data objects necessary to rapidly implement this next set of nodes are pre fetched, in order to reduce overall system response time.

Operation of the system may be more fully understood and appreciated, upon consideration of the detailed functions supplied by various servers which would be used to establish the environment of an electronic mall, as presented herein.

SUBSCRIBER SERVICES (FIG. 19)

Logon

After the subscriber dials a telephone number displayed on the television screen, a logon server 76 within LOC 24 gives the subscriber access to the digital interactive multimedia presentation and communications system of the present invention. If the digital interactive system is broadcasting on two or more display channels, each channel displays a different telephone number for system access. Generally, the local access point will have the ability to automatically deliver the calling telephone number to the LOC. However, should this ability not be implemented, the subscriber can be prompted by the logon server 76 to manually enter his telephone number on the Touch-Tone keypad. Once initial communication is complete, the system checks its available resources to see if it has the resources necessary to support the subscriber and then proceeds to allocate these resources. If any necessary resource is currently in use, the subscriber is prompted via telephone to enter the latest time he would like to be called back.

The logon server 76 uses a market segmenter function to determine which markets ar available to a subscriber to allow the system to configure different stores and malls for different subscribers based on their demographics and shopping history, and according to the commercial clients' specifications.

Once the logon server 76 has determined that sufficient resources exist to support the subscriber, it proceeds to send data to a session server 74 which is allocated to the subscriber for the duration of the shopping session. This data includes information identifying the subscriber, a market segment table defining the markets which this particular subscriber may view, and the identity of the channel server which will provide the distribution path to the subscriber.

If proper resources are not presently available on the system, the subscriber's identifying information is transmitted to a call back manager server 71 and a voice network server 70 so that the subscriber may be contacted when resources become available.

CALL-BACK MANAGER

When insufficient system resources exist to support a subscriber at logon time, the call-back manager server 71 allows the system to call the subscriber back when resources are available. The call back manager 71 has two main functions. First, it obtains times, suitable to the subscriber, to perform the actual call-back, and second, it periodically checks to see whether the necessary system resources are now available, and if so, it initiates a call back procedure through voice network server 70 (FIG. 21).

CHANNEL CALCULATOR

When a subscriber has a choice of at least two display channels which broadcast the digital interactive multimedia presentation and communications system on his television, each channel specifies a different dial-up telephone number to be used when gaining access to the system. The channel calculator server 78 determines which display channel the subscriber is tuned to so that this information can be sent to the presentation player which services the subscriber to ensure that it will broadcast on the correct display channel frequency. Additionally, the channel calculator 78 determines which channel server 36 (FIG. 2 and FIG. 21) to use.

MARKET SEGMENTER AND MARKET CHECKER

The market segmenter server 75 and market checker server 85 work together to provide a market-specific mall to the subscriber. To do so, the market segmenter compares demographic information which the consumer has previously entered with the demographic requirements specified by commercial clients to determine which markets the consumer may access. The market segmenter server 75 then builds a table of market entries with an indication as to whether or not the subscriber is eligible for a particular market entry. This table is used by the market checker server 85 as the subscriber navigates the mall. The market checker server 85 and market segmenter server 75 work in conjunction with each other to provide a specific mall environment for a subscriber based on his particular demographic information. The market checker server 85 compares the market segment table entry with information in the navigation nodes to determine what should be displayed to the particular subscriber, and where within the mall he may navigate. Markets in this sense also determine which of several prices are displayed for a given product.

SUBSCRIBER ENROLLMENT

New subscribers are permitted to browse the mall but cannot purchase items until they have been properly enrolled in the system. When a new subscriber attempts to purchase an item, he is automatically bridged to the consumer services center by the subscriber enrollment server 87. Consumer service creates identifying information for the subscriber and provides him with a personal identification number ("PIN"). The subscriber is prompted to enter the PIN number before utilizing any shopping functions. Thus, in addition to demographic information, credit card numbers and personal directories can be maintained for individual household members.

SESSION SERVER

The session server 74 accommodates navigation through the electronic mall, updates the subscriber's records, and controls what the subscriber is shown. It also arranges for support services from other processes such as cashiering, stock availability checking and the consumer service center.

As such, the session server 74 maintains the complete context of the subscriber's shopping session and provides the means for the subscriber to navigate through the mall. When a subscriber logs on to the system, he is allocated a session server 74 for his exclusive use for the duration of the shopping session. The session server 74 provides the software capability necessary to retrieve all required data objects, including consumer and client information. The session server 74 maintains this data in the local data base of the LOC. To increase its efficiency, during idle processing, e.g. while waiting for the subscriber to respond, the session server 74 initiates pre-fetches of objects it is most likely to require to respond to the subscriber's next action.

The session server 74 not only receives the subscriber's keystrokes, but also sends appropriate scripts and keystrokes to the relevant channel server 36 for immediate echo-back to the subscriber, thereby providing an important feedback function. Additionally, it maintains the history of the subscriber's navigation through the mall, as a means for easily reversing direction to previous nodes of the system.

The session servers 74 maintain those portions of the subscriber's records which deal with demonstrated shopping preferences. This information is used to personalize the shopping navigation for subsequent shopping sessions.

Purchases may be made by adding items to a "shopping cart". Servers are provided which allow a subscriber during a shopping session to add items to the shopping cart, and review or modify the contents of the shopping cart.

CASHIER

Subscribers may split items in the shopping cart into groups which utilize different payment methods and shipping instructions. Further, subscribers who have purchased items from grocery store clients may specify their desired delivery date, time, and address. Once all the options have been determined, the cashier server 84 sends a summary screen of the entire order to the subscriber, which includes information on total cost, estimated taxes, delivery and shipping charges.

ORDER POSTING

The order posting server 98 performs the saving of consumer orders to disk, so that in the event of network failures, the orders can be recovered and delivered at some later time.

Customized servers which add more functions to the basic subscriber services may be easily added to the digital interactive multimedia presentation and communications system. Such services may include a personal directory for keeping customized list of items which cross store boundaries. For example, a subscriber may keep lists of groceries he regularly buys so that he can add the entire list to his shopping cart. Other customized shopping services which may be easily implemented by appropriate servers include a bridal registry server, maintained on a mall-wide basis, a product search server to provide subscribers with the ability to easily find products in a store based upon various input information, e.g. price, sex, age, etc., and a size reminder server, which allows subscribers to keep information on clothing sizes for various individuals. Other specialized subscriber servers may be easily added as the system grows to provide additional individualized software functions.

CLIENT SERVICES (FIG. 20)

The digital interactive multimedia presentation and communications system supplies a number of servers which provide useful software functions to the commercial clients who are on the system. Several illustrative examples of such client servers 47 in a preferred embodiment of the invention are:

CLIENT DATA BASE

The client database server 99 maintains a data base of client information. It provides the ability to add, change, and delete clients, maintain client billing rates, client history and provide data base reports. This server also supplies the capability to initiate a transmission of new or changed client information to a particular LOC of the system.

STATISTICS REPORTING

The statistical reporting server 107 provides information required for marketing analysis. Data is captured during each subscriber's shopping session, and is used to generate logs of demographic information as to purchasing activity in different markets. Additional information on how subscribers navigate through the mall is also available. Reports providing statistical information generated from these logs are produced and provided to commercial clients.

Other client services servers 47 on the system provide for the production of billing reports to the clients, settlement functions for all credit card purchases, and various end of day reconciliation functions.

NETWORK SERVICES (FIG. 21)

In a preferred embodiment of the invention, a number of specialized network servers 49 (FIG. 2) provide software functions which define and support the overall multimedia presentation and communications system and are exemplified below:

VOICE NETWORK SERVER

The voice network server 70 ("VNS") is the interface between the subscriber's response and the software necessary to service his session. For fault tolerance, each LOC may be configured to have at least two telephone data lines, connected via modem interfaces from the local access point ("LAP") to at least two voice network servers 70 on separate chassis. The voice network server 70 controls the modems, retrieves the subscriber's key presses and sends the key presses to the subscriber's session server 74. If a bridge to the consumer services center is required, the voice network server 70, upon instruction from the session server 74, initiates the bridge through the local access point.

CHANNEL SERVER

The channel server 36 has the important role of fetching data objects require by the scripts representing presentations chosen by subscribers to view. The channel server 36 then meters these data objects out to the distribution channel modulator at a rate which will not overrun the storage capacity of the presentation players. The modulator and transmitter then send the data from the LOC to the CATV headend 38. By using the channel information obtained during consumer logon, the channel server 36 associates a shopping session with a particular presentation player 54. The channel server is supplied with a presentation script object which it uses to request the objects it requires to make up the presentation, and transmits them as they are received directly from other applications to the presentation player 54 along with a copy of the script object. The channel server 36 obtains large objects, such as video images, directly from a volume manager 35. Other objects, such as variable text may be received from other applications servers. The channel server 36 is designed to recognize high priority objects, such as echo back key presses, pause/resume navigation commands and any presentation player commands, and expedites their delivery. Since the distribution channel associated with a particular channel server 36 services multiple presentation players 54, &:he channel server 36 generally processes requests for multiple concurrent sessions.

IMPORT/EXPORT GATEWAY

The import/export gateway server 77 permits transfer of data between local operating centers (LOC's) and regional operating centers (ROC's). Since an entire collection of data objects for the system is maintained only at the ROC, an LOC must import objects not currently resident. If an LOC receives a request for an object it does not have, the import/export gateway server 77 tries to obtain the object from the next LOC in the network hierarchy. Further, when data updates occur at an LOC, the import/export gateway server 77 is used to ensure that other LOC's receive the same update. In the event that insufficient resources are available at an LOC to accommodate an object, the least recently used object will be purged from the LOC to provide space for the new object. In this manner, the system provides for dynamic reallocation of stored objects. In a preferred embodiment, the LOC is configured with sufficient resources to accommodate the anticipated volume of data, so that such reallocation does not have to be performed during a shopping session.

Additional network servers 49 are provided to handle order delivery, report on inventory availability, verify credit authorization, and provide automatic bridging and linked-shopping to consumer services, so that consumer services personnel may view the context of the shopping presentation.

SYSTEM MANAGEMENT (FIG. 22)

A number of systems management and applications server 51 provide system management functions for the digital interactive multimedia presentation and communications system. For example, an operations interface server provides a human interface with the system. It permits the system to accept data from operators via terminals, and to return both solicited and unsolicited information to the terminals. The operations interface server allows operators to kill processes, install a new mall, store, or presentation, and initiate file uploads or downloads. Other examples of system management servers, in a preferred embodiment of the invention, are:

COMMISSIONER

The main purpose of the commissioner server 140 is to configure an LOC. During start-up, an empty LOC is recognized and a single board computer (SBC) is randomly allocated by a countdown process to serve as a commissioner server 140. The commissioner server 140 then broadcasts its presence and identity, and uses a configuration table to assign other single board computers to provide the capabilities of the various servers, with the allocation mix being dependent upon the historical use of servers at other LOC's. In addition to setting the initial system configuration, the commissioner server 140 also can dynamically recommission single board computers during system operation using the operational configuration data objects supplied by a configuration manager in response to the activity of the system.

ACTIVITY RECORDER

All processes "report in to" the activity recorder server 73, either to record a specific event, or at specified times. The activity recorder server 73 maintains a table of the status of all single board computers in the system. As they report in, processes include activity and status data. The activity recorder server 73 buffers, and during idle processing stores this data for use by the activity monitor server 142 and configuration manager 143. Typical of reported data are systems statistics maintained by such servers as the object locator and volume manager. The activity recorder server 73 further receives information from the subscriber services applications that reflect subscriber activity.

ACTIVITY MONITOR

The activity monitor server 142 provides activity reports on the LOC either at set periods or on an as-requested basis. Some of this information is used to redistribute objects across volume managers and thereby provide for better load leveling. The activity monitor server 142 has sufficient information to calculate subscriber response times. An analysis of this information can indicate when performance at the LOC is degrading to unacceptable levels. When this occurs, an alert is sent to the operations interface.

CONFIGURATION MANAGER

The function of the configuration manager server 143 is to update a configuration table to be used by the commissioner server 140 to determine which processes are needed to serve the LOC. The configuration manager server 143 periodically accesses the activity table produced by the activity recorder. The activity table is then compared with the current operations configuration table. A new configuration table is then generated based on usage profiles by day-of week and time-of day contained in the configuration table and based on conclusions drawn when the configuration manager analyzes the activity table to predict future requirements. The configuration manager server 143 adjusts the configuration data object accordingly to obtain a more efficient distribution of applications. As part of this analysis, a specified percentage of idle applications, as the norm, is compared with a permitted normal variance.

PRE-LOAD

Certain objects, such as main indices, screen objects used in the buying process, and system parameters are always required to be resident at the local operating center (LOC). The pre-load server 144 is a process which obtains these objects when the LOC is configured, thereby reducing the overhead and degradation of response times that would occur if all objects were imported on a demand basis. The pre load server 144 accesses an object which is itself a list of all objects to be pre-loaded to the LOC. Using statistics reported by the object locator server 148 and volume manager server 149 to the activity recorder server 73, this pre-load object is dynamically maintained so that the pre load server 144 runs at a low priority and does not preclude subscribers from using the system.

JOB SCHEDULER

The job scheduler server 145 is used to control batch type applications such as end of day processing. It can schedule applications by month, by week, by day-of-week and by time of day.

HIT MAN

The hit man server 146 is used to specify the deletion of outdated objects from an LOC. Periodically, the hit man server 146 accesses a list of objects to be deleted from an LOC. The list is imported via the import/export gateway server 77. The hit man server 146 interfaces with the object locators and volume managers to ensure that the objects are deleted.

PLACEMENT AGENT

The placement agent server 72 is the coordinator of applications which require the assistance of other applications. Applications that are not being utilized volunteer to one of several placement agent servers 72 strategically commissioned by the system. These applications are maintained as a table of single-board computers known to that particular placement agent server 72. When an application requires the services of another application, it sends a request for assistance to a placement agent server 72. If that placement agent has a volunteer of the application type requested in its table, it provides communication between the two applications. If a placement agent server 72 cannot satisfy the request, it sends the request to other placement agents on the system.

OBJECT LOCATOR

The object locator server 148 allows the system to access a data object. The object locator server 148 determines the volume on which a data object is expected to reside, based on an algorithm using the object's name. The object locator server 148 maintains a table which maps particular data object groups to particular volume manager servers 149. The object locator server 148 first applies a formula to the requested object's name in order to determine to which of about 10,000 groups the data object belongs. Each volume manager server 149 maintains a list of each of the data objects it contains together with the disk storage location and other maintenance statistics. This information is then sufficient to locate any specific objects within the LOC storage facility.

VOLUME MANAGER

Figure 5:
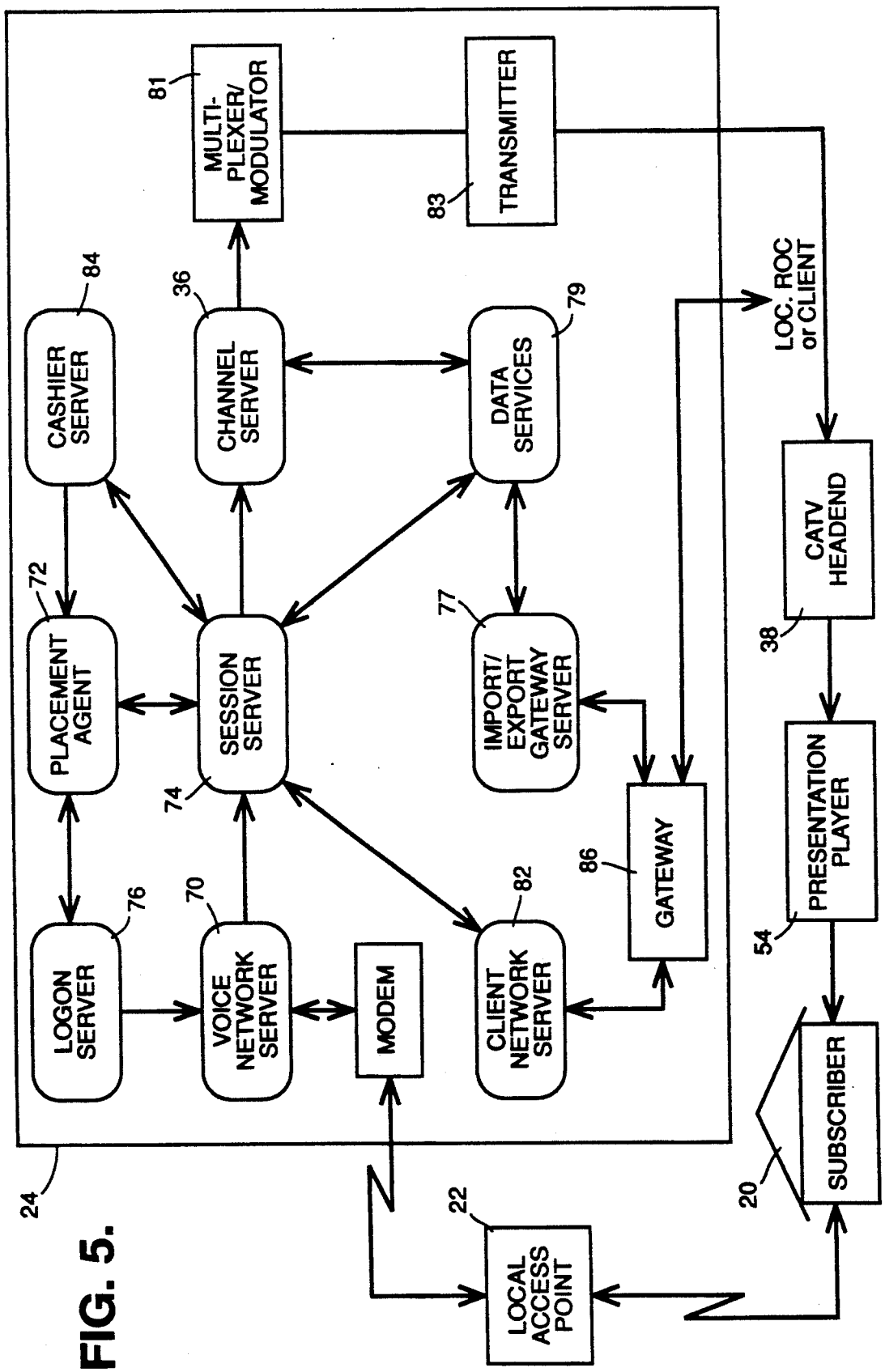
FIG. 5 illustrates the message flow which occurs between the session server and other servers of the system, during a typical shopping session.

The volume manager server 149 is an application managing all the data objects on a single disk drive. It provides both read and write access of data objects for use by other applications as well as data use statistics. If an object is not found, a request to import the object is generated. Some requests, such as from the cache requester server 150 may not be to return an object, but only to cache it in controller main memory in preparation for a future request. These requests are performed during the volume manager server's idle processing. During idle processing, or when disk utilization has reached a specified limit, the volume manager server 149 may delete infrequently used objects. Data services 79 (FIG. 5) comprises the object locator servers 148, the volume manager servers 149 and the cache requester servers 150.

CACHE REQUESTER

The cache requester server 150 initiates pre-fetches of objects likely to be required in the future. This is done to assure quick access to the data objects thus cached when an actual request to retrieve such an object is made.

All the server processes execute within an application programming environment ("APE"). In this environment, processes generally have no knowledge of the context of any other process, nor do the processes have access to global data areas. Although processes may reside on the same SBC, the same chassis, or possibly in different cabinets within an LOC, the location of any process is transparent to the other processes.

Whereas session servers 74 must be specifically allocated to a subscriber during a session, other servers are available directly through the application programming environment. Examples of servers which may be obtained directly through a request to the application programming environment are the placement agent servers 72, and the hitman servers 146. Further, requests which require the reading and writing of data from the data base, and therefore require use of the object locator server 148 and volume manager servers 149, may also be directly requested through the APE, by placing a request for "data services". Message passing from one application to another, and memory allocation and deallocation may also be requested directly through the APE.

In order to provide a better understanding of the interplay between the different servers described above during operation of the digital interactive system, it is useful to specifically describe the chain of events which might occur during the system's operation by giving some specific examples. The first example illustrates the events which occur during the logon process, in which initial communications between the subscriber and the system are established, and whereby specific servers, such as a session server, are assigned to handle the subscriber's requests. The second illustrative example describes the sequence of events which occurs during a simple series of shopping transactions made by the subscriber.

Figure 4:
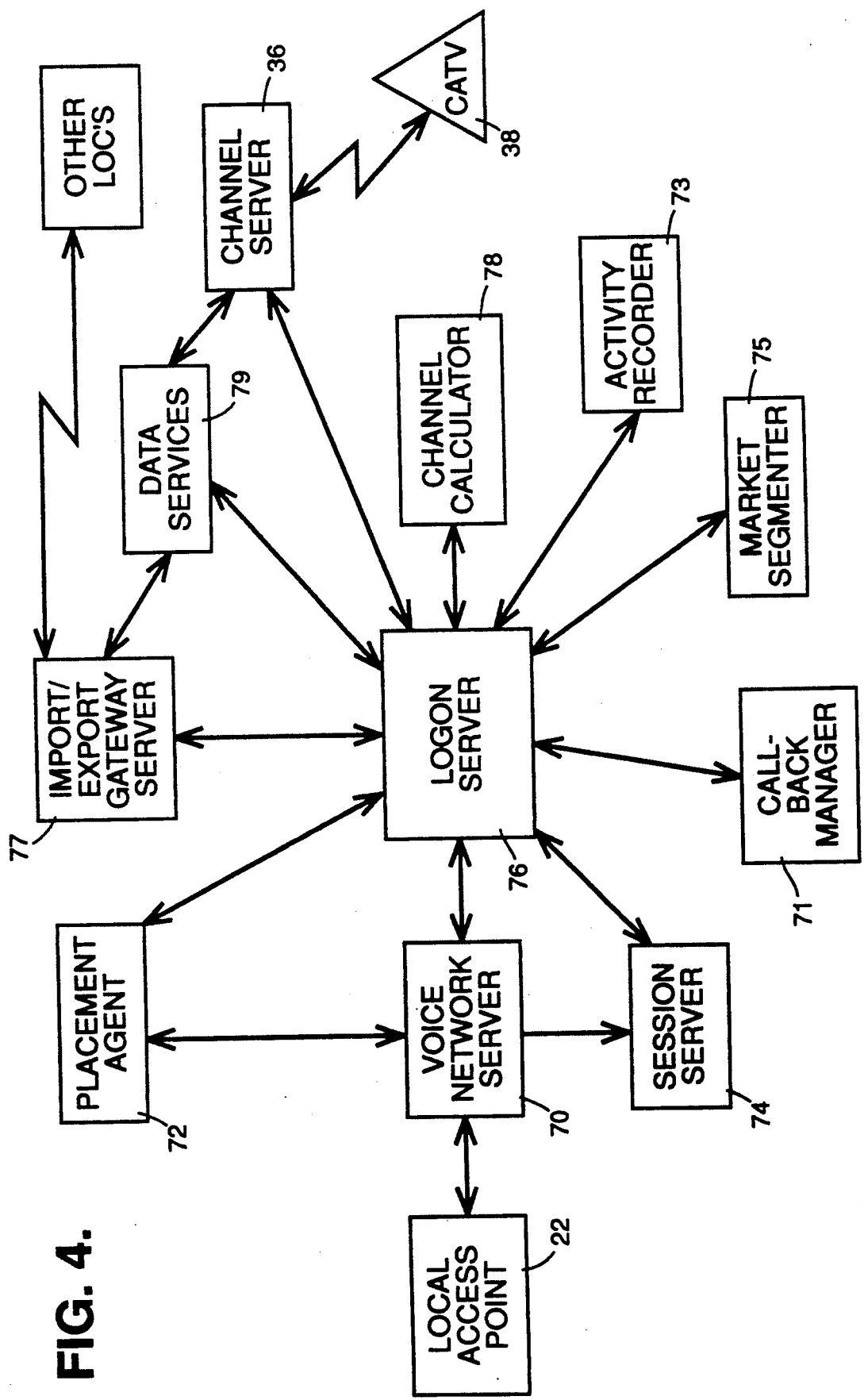
FIG. 4 illustrates the message flow which occurs during the log on process, and the relationship between the log-on server and other servers which provide the software functions that establish the environment of an electronic shopping mall.

The message flow during the logon procedure is outlined in block diagram form in FIG. 4. With reference to that figure, the logon procedure is initiated when LAP 22 connects a subscriber's phone line to the voice network interface, which is controlled by a voice network server ("VNS") 70. The voice network server 70 in turn sends a message to the placement agent server 72, requesting an available logon server 76. The placement agent server 72 responds to the voice network server 70 with the address of the available logon server 76. The voice network server 70 also requests the placement agent server 72 to find an available session server 74. Again, the placement agent server 72 acts to return the address of an available session server 74 to the voice network server 70. The voice network server 70 then performs an initializing handshake communication with the logon server 76, in which the address of the session server 74 is passed to the logon server 76.

The logon server 76 next initiates a request to the voice network server 70 that the voice network interface produce a voice message asking the subscriber to enter his phone number on his Touch-Tone telephone keypad. LAP 22 receives the key presses and passes them to the voice network server 70, which in turn transmits this data to the logon server 76. The logon server 76 next sends a message to data services 79 requesting the subscriber's household data object (which contains specific information on the subscriber, e.g. his personal identification number, etc.). If data services 79 is unable to locate this object, the logon server 76 is informed and then sends a message to the import/export server 77 requesting that the subscriber's household object be imported from other LOC's. If this object is not found at the other LOC's, the logon server 76 then initiates a request to the voice network server 70 which asks the subscriber to enter a sequence of digits displayed on his television as part of the "attractor" screen. These digits represent routing information to the system which identifies the particular presentation player that is servicing the subscriber. LAP 22 accepts the subscriber's keypress responses and passes them to the voice network server 70, which transmits the information (the presentation player ID) to the logon server 76.

The logon server 76 next requests the placement agent server 72 to give it the address of an available channel calculator server 78. Logon server 76 then sends a message to the selected channel calculator 78, providing it with the presentation player ID and the subscriber's display channel and obtains from the channel calculator 78 the ID of the distribution channel required to service the subscriber's presentation player. The distribution channel ID also defines a particular channel server 36 that will be allocated to the subscriber. Through communication with placement agent server 72, the logon server 76 is given the address of the appropriate channel server 36. The channel server 36 determines if the appropriate presentation player is available and returns this information to the logon server 76.

At this point, if resources are not available, the logon server 76 places the subscriber into call-back status by communication with callback manager 71. Assuming that all resources are available, the logon server 76 then requests the placement agent 72 to find an available market segmenter 75 and communicates with the market segmenter 75 to obtain the market segmentation table for that subscriber. Logon server 76 then initiates a handshake communications with the session server 74, and passes the subscriber's household data object, the market segment table, channel server data and all addresses of associated servers to the session server 74. The logon server 76 then sends a message to data services 79 to obtain a script designed to display a "welcome" presentation to the subscriber. The script is returned to the logon server 76, which in turn sends the script, the distribution channel ID and the presentation player ID to the channel server 36. The channel server 36 then obtains from data services 79 the particular welcome presentation objects, which it assembles and sends to the subscriber's presentation player.

When this is done, the channel server 36 responds to the logon server 76 that the welcome presentation has been presented to the subscriber. The logon server 76 responds with an appropriate message to the activity recorder 73. Finally, the logon server 76 sends a message to voice network server 70 informing it that the subscriber is now logged onto the system and that a specified session server 74 is in use. At this stage, the logon server 76 is free, and volunteers its services to the placement agent 72. Future key presses from the subscriber will be forwarded in regular fashion by the LAP 22 to the voice network server 76, which will in turn forward the key presses directly to the appropriate session server 74 that has been allocated to the subscriber.

Once logon has been established, and the subscriber has gained access to the system, navigation to different nodes of the system where shopping transactions are performed is supervised by the session server 74. What follows is an example illustrating the sequence of events which occurs when a simple series of transactions is made by a subscriber. In a real shopping session, many more transactions would occur, and many more servers would be involved. However, the following example serves to further demonstrate the nature of the interactions between the session server and other servers within the digital interactive multimedia presentation and communication system of the present invention.

In this example, the logon procedure, as described above, has resulted in a particular session server 74 being assigned to the subscriber. The identification of the session server is known to the voice network server 70. The voice network server 70 also knows the identification of the physical port on the telephone interface equipment which the subscriber is using. With this information, the voice network server 70 can route digits entered by the subscriber via the Touch-Tone keypad on his telephone to the correct session server 74.

The illustrative example of a simple series of transactions begins with the voice network server 70 passing on the digital characters which result when the subscriber 20 makes a choice from a menu displayed on the television screen. The interaction between the session server 74 and other servers of the system during the shopping session is illustrated in block form in FIG. 5. The sequence of events which typically occurs is now described, and may be best understood with reference to that figure.

The digital characters corresponding to the key presses are transmitted to a local access point 22 and via modem 27 to a voice network server 70. These signals are then sent by voice network server 70 to the particular session server 74 that has been allocated to the subscriber 20. In order to provide rapid feedback of the key presses to the subscriber 20, the session server 74 constructs a script to display the digits that have been entered by the subscriber, and sends the script to the channel server 36 which services that particular subscriber. The channel server 36 in turn sends the script to the multiplexer/modulator 81 and transmitter 83 for transmission to the CATV headend 38, and from there to the particular presentation player 54 which is connected to the television set being used by subscriber 20.

Meanwhile, the session server 74 fetches a script shell, which comprises a partially formed script, from data services 79, and which relates to the selection made by the subscriber 20. The session server 74 updates the script shell with the subscriber current market data, perhaps excluding some products not offered to the subscriber because of demographic considerations, or perhaps changing the price of some display product to correspond to the subscriber's situation. The completed script is then sent on to the channel server 36. Upon receipt of the script, channel server 36 requests the necessary audio and video image objects from data services 79, and proceeds to send a copy of the script to the subscriber's presentation player 54.

Data services 79 delivers the requested objects to the channel server 36, which then sends the objects through the multiplexer/modulator 81 and transmitter 83, and on to the subscriber's presentation player 54. At this point, we assume that the subscriber again sees a menu, and makes his choice by entering Touch-Tone signals on his telephone. These Touch-Tone signals are converted to digital characters at the local access point 22, and are delivered through the voice network server the subscriber's session server 74. In this particular example, we assume that the subscriber 20 has chosen to purchase an item.

To complete the purchase request, session server 74 interacts with the client's network server 82 to access the client's inventory system and verify that the particular selected item is available. For purposes of this example, we assume that the merchandise item is available. The session server 74 then requests a cashier server 84 from the placement agent 72. The placement agent 72 returns the name of an available cashier server 84 to the session server 74. The session server 74 then interacts with the cashier server 84 and with a credit authorization server (not show) which would normally be provided via the client network server 82 and the gateway 86, to authorize the sale if payment is to be made by credit card. The session server 74 proceeds to interact with the cashier server 84 to "ring up" the sale. This would normally include certain calculations such as sales tax and would include certain subscriber interactions, such as delivery information specification, which are not shown here. When the cashier server 84 is finished with the sale, it volunteers itself back to the placement agent 72. A sale confirmation script is constructed by the session server 74 and sent to the channel server 36 for transmission to the subscriber 20.

The order for the merchandise is sent to the client network server 82, and then on to the particular client through gateway 86. The channel server 36 proceeds to send the sale confirmation script, and accompanying audio or video images to the subscriber presentation player 54 via the multiplexer/ modulator 81 and transmitter 83. Meanwhile, the session server 74 has pre fetched the script shell from data services 79 for each possible choice that the subscriber is offered in the sale confirmation presentation. The subscriber 20 makes a choice from the menu presented (such as suggestions for synergistic sales). His choice reaches the session server 74 via the voice network server 70. Session server 74 proceeds to update the script shell which has been prefetched, with the information representing the subscriber's choice, and sends it to the channel server 36.

As before, channel server 36 sends a copy of the script to the subscriber's presentation player 54. Channel server 36 also requests the audio and video objects called for by the script from the data services 79. For illustrative purposes, we assume here that one of the image objects is not present in the local operating center 24. To obtain the required data object, data services 79 sends an import request to the import/export server 77 to obtain the image data from another local operating center or possibly a regional operating center. Gateway 86 acts to fetch the image data from the other operating center and delivers it to the import/export server 77, which delivers it to data services 79. Data services 79 stores the image data on one of its local disk volumes, reclaiming space if necessary on a least recently used basis, and then sends the image data to channel server 36. As before, channel server 36 sends the image data to the subscriber's presentation player 54.

We now assume for purposes of this illustrative example, that the subscriber choses to terminate the shopping session by hanging up the phone. The "hang up" signal comes to session server 74 via the voice network server 70. The session server fetches a termination script shell from data services 79, updates it, and sends it to the subscriber 20 through channel server 36. In this manner, the subscriber 20 sees a "Thank You For Shopping" presentation and then a "Welcome" screen inviting a new shopping session. The subscriber's personal data records are sent by the session server 74 to data services 79, where they are stored for routine processing and later used by the subscriber 20 when he logs on in the future. Since the shopping session is now ended, the session server 74 volunteers itself to the placement agent server 72 for assignment to a subsequent shopper.

The above overview of the different kinds of servers, their functions, and specific examples of how they interact with each other serves to illustrate how the environment of an "electronic mall" may be established on the digital interactive system of this invention. Since the environment is established within a distributed processing architecture, as embodied in the use of a plurality of identical single board computers, the digital interactive system of the present invention may easily adapt to changing demands by dynamically reallocating its resources. Further, the system may easily grow in functionality, and may be expanded to service new geographical areas, by the simple incremental addition of new single board computers and the formation of new LOC's, as required.

INTRA-LOC COMMUNICATIONS ARCHITECTURE

As described above, the basic hardware structure of a local operating center 24 (LOC), is comprised of a plurality of single board computers (SBC's) which are installed in standard 20 slot chassis. These SBC's run various processes or servers, which comprise the software functionalities of the system. FIGS. 6(A), (B) and (C) illustrate a typical arrangement of equipment cabinets containing chassis and other peripheral equipment for a "small" local operating center which can serve upwards of 500 concurrent subscribers.

As shown in FIGS. 6(A), (B) and (C) the chassis of single-board computers which make up the session servers, volume managers, voice network servers (VNS), channel servers, and all other function servers, along with sufficient spares, are mounted into six standard equipment cabinets 60–65. These cabinets generally provide appropriate power supplies and cooling equipment for the chassis. Disk drives are distributed, as shown, among the equipment cabinets which house the volume managers. The local operating center shown in FIG. 6(A) contain two gateways (the equivalent to gateway 86 in FIG. 5). Gateway 66 on equipment cabinet 60 provides a link to the client site operations of the commercial clients who have presentations on the system, whereas gateway 67 on equipment cabinet 63 is the communications link to other local operating centers and regional operating centers of the digital interactive system.

Equipment cabinets 64 and 65, which house the channel servers 68 and 69 and the VNS servers 58 and 59, also house peripheral equipment consisting of modems, multiplexers and modulators. The output of the modulators goes to a transmitter 56 for transmission to the headend facilities of the CATV companies to which the local operating center is connected. Multiplexer-Modulator 57 obtains stream data from external audio/video sources, and multiplexes this stream data, for reasons which will be explained with more particularity below, with the data which is internally present within the database of the local operating center. Communications between single board computers on the same chassis is performed via an industry standard Multibus II protocol, as provided on the common backplane of each chassis into which the SBC's are connected. Communications servers are allocated to SBC's marked "COM" in FIGS. 6(A), (B) and (C), and are connected to each other via a plurality of SCSI buses. The particular scheme by which the individual chassis are interconnected to each other by these buses to establish a communications network within the LOC is described more fully in this section.

Communications within the local operating center must satisfy performance criteria which relate to the functional scope and size of the LOC. For example, a typical LOC of the digital interactive system of this invention must be able to support approximately 100 chassis, with sixteen channel servers, in order to sustain as many as three thousand concurrently active subscribers. It is desirable that the communications architecture be implemented in such a way that only a small number of SBC's need to function as communications servers. Further, in order to provide high data throughput while maintaining low latency, particularly along the high volume pathways between the volume managers and the channel servers, it is important that the architecture provide communications between any SBC on any chassis, in a manner which requires a minimum number of intermediate hops to move data to any point within the system. In this context, a hop designates a transfer of data between two chassis (along a SCSI bus). The intra-LOC communications architecture must also satisfy a number of practical requirements related to system cost and effectiveness, which translate into an implementation having a low number of cables and connectors, good reliability and resulting in efficient utilization of all data pathways.

An intra-LOC communications architecture which satisfies the above requirements is shown in FIGS. 7–9. The connection scheme utilizes the industry standard Small Computer Systems Interface (SCSI). Since this is an industry standard interface, several inexpensive integrated circuits are commercially available to perform the required interface functions. A SCSI data bus can support a maximum of eight SCSI interfaces, and can transmit data at a maximum rate of four megabits per second. FIG. 7 shows a typical scheme for redundantly interconnecting 232 chassis, such that the transfer of data between any single board computer on any chassis requires no more than three intermediate hops. More particularly, and with reference to FIG. 7, the 232 chassis are shown arranged in four main stacks, denoted by reference numerals S1-S4. Each of these stacks contains eight columns of chassis, denoted by reference numerals C1-C8. Each column of chassis comprises seven individual chassis denoted by row designations R1-R7. Eight individual chassis comprise row 0 (R0). Thus, FIG. 7 schematically represents $8 \times 7 \times 4 + 8 = 232$ chassis.

As shown in FIG. 7, two SCSI buses 88 and 89 connect the chassis in the column C1 of stack S1, to chassis 90 and 91 in row 0. Although not explicitly shown in FIG. 7, each of the other columns (C2-C8) within stack S1 also have two SCSI buses which connect to chassis 90 and 91 of row 0. The eight terminals on each of the SCSI buses terminate on single board computers which act as communication servers. The parallel communication pathways provided by the two SCSI buses on each column of chassis increases the overall transmission speed of the system, and provides for redundancy in the event that one of these buses should fail. Moreover, even if one communication server on a chassis is out of order, a data pathway is still available through the second communications server which communicates with the other SCSI bus. The columns C1-C8 of stacks S2, S3 and S4 are similarly connected, via two redundant SCSI buses, to corresponding chassis within row 0; For example, each of the columns within stack S2 connect via two SCSI buses to chassis 92 and 93 of row 0, each of the columns within stack S3 connect via two SCSI buses to chassis 94 and 95 of row 0, and each of the columns within stack S4 connect, as shown, via two SCSI buses to chassis 96 and 97 of row 0. To complete the intra-LOC communications system, a preferred embodiment of the present invention provides that each chassis in row 0 is connected by a separate point to point, two terminal SCSI bus to each of the other chassis in row 0. As before the SCSI bus terminations connect to SBC's which function as communications servers. For purposes of clarity, the complete connection scheme is only partially shown in FIG. 7 with respect to the leftmost chassis 90 in row 0.

A study of FIG. 7 indicates that communications to channel servers may be optimized, if the channel servers reside in row 0. This is because data from any single board computer on any chassis in the system requires at most two hops to be routed to any single board computer in row 0. One hop is required to move down to a particular chassis in row 0 from anywhere in the system, and a second hop is required, as a result of the point-to-point connections between each chassis in row 0, to move from one particular chassis of row 0 to any other within row 0. Thus, since latency of data transmissions is reduced by minimizing the number of hops, and because latency is a particular problem during transmission of large data objects, it is desirable to have the channel servers located within the chassis of row 0. Further inspection of FIG. 7 also illustrates that, at worst, three hops are required to move data from any single board computer within the LOC to any other, i.e. two hops to move to any chassis within row 0, and a third hop to move up to a particular column within a stack.

All the SCSI buses connect to single-board computers which function as communications servers. These servers perform the routing of data between chassis. As part of the operating system which implements the application program environment (APE), every process contains information identifying the particular chassis number where it resides. This chassis number identification is transmitted via the Multibus II backplane to communication servers resident on the chassis. Each communication server knows the number of the chassis in which it resides, and to which chassis numbers it can deliver data. This information is stored within a routing table at each communication server. When a data message is to be transmitted, the operating system first tries to deliver the message via the Multibus II backplane to other single-board computers on the chassis. If these single board computers are not the designated recipients of the message, the communication server that is resident within the chassis checks its routing table, and sees what other chassis it can deliver to. The data message is then placed on the SCSI bus attached to the communication server, and is transmitted to another chassis. Upon arrival of the data at the next chassis, the operating system again tries to deliver the message to single board computers within that chassis, and if it fails, a communication server places the message once more onto a SCSI bus for delivery to another chassis. This procedure is repeated until the message arrives at a particular chassis number which contains the single board computer that is the designated recipient of the message. As shown above, the interconnect architecture disclosed herein requires no more than three hops (excursions along a SCSI bus pathway), before a recipient anywhere within the system acquires the message.

FIG. 8 illustrates how this particular interconnect scheme can be expanded to provide intra-LOC communications capability between as many as 456 chassis, with no more than three hops between any two particular chassis. In FIG. 8, there are eight stacks S1-S8, each of which comprises eight columns C1-C8 of chassis. Each column contains seven chassis, as denoted by rows R1-R7. Row contains eight individual chassis. In FIG. 8, the redundant connections present in FIG. 7 have been removed, and replaced with a single SCSI bus which connects each of the eight columns C1-C8 in each of the eight stacks S1-S8, to each of eight chassis in row 0 which perform the exchange of information between different stacks. As in FIG. 7, each chassis in row 0 is further connected to every other chassis in row 0 by a point to-point, two terminal SCSI bus.

Accordingly, and as described above, no more than two hops are required to move data from any other function server which resides anywhere in the system, to a designated chassis in row 0. To reduce latency, it is therefore desirable that the channel servers or any other very active functions be placed within row 0. This is important because transmission of data from the volume managers to the channel servers represents the major transmission path and load on the system. Further, and as illustrated with respect to FIG. 7, FIG. 8 similarly ensures that no more than three hops occur in communicating data from any single board computer within the 456 chassis, to any other.

As illustrated in FIG. 8, the particular intra-LOC communication architecture scheme of the present invention may be applied to a large number of chassis. A typical local operating center for the digital interactive multimedia presentation and communication system is generally required to service up to three thousand concurrent subscribers. FIG. 9 shows the chassis requirement for an LOC of this size. With reference to FIG. 9, the functionality required by the volume managers is distributed among 14 chassis which are schematically depicted as being placed within two columns 104 and 106. Other function servers are distributed among 84 chassis which are schematically depicted as positioned within the other 12 columns shown in FIG. 9. Each column in FIG. 9 contains seven chassis. Two interchange chassis 100 and 102, are also shown which preferably house the single board computers that provide channel server functions. For an LOC of this size, which generally comprises 16 channel servers, each of the interchange chassis 100 and 102 may be configured to house eight channel servers.

In order to provide the LOC with the high throughput necessary for transmission of data between the volume managers and channel servers, the two columns which represent the volume manager locations are each provided with four SCSI buses. To provide redundancy for purposes of fault tolerance, the SCSI buses from each of the two columns 104 and 106 of volume managers are split and connected to each of the two interchange chassis 100 and 102 which contain the channel servers. Further, each of the 12 columns which house various function servers have a single SCSI bus which connects to one of the interchange chassis 100 and 102. Six of the function server chassis columns connect to interchange chassis 100, and the other six to interchange chassis 102. To complete the intra-LOC communications architecture, the two interchange chassis are connected to each other with a single point to-point SCSI bus. Thus, each interchange chassis 100, 102 has six SCSI buses connected to six columns of function servers, four SCSI buses which connect the two columns of volume managers, and a single SCSI bus which provides communications between the two interconnect chassis 100, 102. The total of eleven SCSI buses entering each of the interconnect chassis 100, 102 are connected to the same number of communications servers resident on each of the interchange chassis 100, 102. In the preferred embodiment of this intra-LOC communications architecture, the remaining space on each interchange chassis is allocated to 8 channel servers.

As described with respect to the general interconnect architecture schematically illustrated in FIGS. 7 and 8, the more specific architecture of a typical LOC illustrated in FIG. 9 also ensures that there are at most two hops required to move data from any particular single board computer which serves as volume manager to a channel server resident on one of the two interconnect chassis. Further, any single-board computer located on any chassis in the system can communicate with any other single-board computer within the system by utilizing at most three hops for data transmission. In addition to satisfying system requirements related to latency and data throughput, the particular interconnect schemes illustrated in FIG. 7-9, wherein the SCSI interface provides buses which employ eight terminal connections in combination with buses which provide specific point-to-point two terminal connections, result in a communications architecture which is easily expanded, which can be implemented with a low number of cables, connectors, and communication servers, and which results in good utilization of all the data pathways.

THE DISTRIBUTION CHANNEL FRAMING TECHNIQUE

The distribution channels on which data are transmitted to the presentation players are standard 6 megahertz wide CATV channels whose base frequencies are often outside the normal subscriber tuning range and which conform to appropriate NTSC and FCC requirements. In the prior art technology described in U.S. Pat. No. 4,734,764, for each display channel allocated by the CATV company for viewing presentations, two distribution channels must be allocated to carry the signals from the prior art system to the frame store units distributed in the field. One channel is dedicated to the transmission of analog audio signals, and the second to the transmission of analog video signals. In the digital interactive multimedia presentation and communications system of the present invention, all information necessary to serve a subscriber is carried on a single distribution channel in digital form. Peripherals associated with the channel servers that are resident in the LOC modulate the digital data onto the distribution channel at a rate of up to 24 megabits per second (including forward error correction (FEC) code).

FIG. 10 illustrates the typical data flow sequence along a distribution channel which connects a channel server to a presentation player. The channel server acquires variable length blocks of data which may comprise digital representations of video images, audio accompaniment, graphics overlays, various scripts necessary to construct presentations, small packets of echo characters, software updates sent to particular presentation players, etc. As such, the channel server constitutes a source of block data 160.

Other sources of data which the local operating system supplies, and which of necessity must be distributed in a continuous fashion, are denoted in FIG. 10 by the stream data sources 164. These stream data sources may provide a number of different types of background music which the commercial client can select when he prepares the scripts for his presentations, or may include ticker tape information to display stock market reports, provide sports scores, weather announcements, etc. This type of information would be displayed in continuous fashion across a small portion of the television screen during the shopping presentations. Thus, the stream sources 164, by their continuous nature, are distinct from the block data sources 160, which are generally stored on the disk drives of the LOC. Moreover, by providing the ability to transmit stream data sources 164, the digital interactive multimedia presentation and communications system of the present invention can provide real-time motion video to a subscriber.

The digital interactive system disclosed herein can support two different kinds of motion video. The first kind of motion may be termed "fixed motion sequences". For example, a commercial client may wish to provide several views when displaying a particular shopping item. In some cases, the commercial client may find it desirable to display a shopping item which rotates so that the viewer may see all sides. These kinds of predetermined "fixed motion sequences" do not have to be transmitted in real-time, and are treated in a manner similar to that of still video presentations. During initial production of the presentation by the store manager, a script is prepared which specifies the appropriate timing for the sequence of still-video images to impart the illusion of motion to the desired "fixed motion sequence" upon playback. The appropriate sequence of frames is stored and recalled in the same manner as still-video images, and is presented as a block of data to the channel server.

The second kind of motion which can be displayed by the digital interactive multimedia presentation and communications system of the present invention is a limited form of real-time motion which necessitates that it be delivered as a stream data source 164. This kind of motion may be used when a bridge is made between the subscriber and a consumer service representative. When this occurs, an inset in the corner of the subscriber's television screen may display the head of the consumer service representative, so that the subscriber has a direct visual link with consumer service. Real-time motion cannot be handled as block data because the buffering requirements that would be necessary would produce unacceptable delays. The consumer service representative would be responding in normal time over the telephone, but the appearance on the screen would be delayed by several hundred milliseconds if buffering were necessary. This type of data must be handled by the system as "stream" data which is brought into the system on separate stream channels and distributed in the manner described herein.

As shown in FIG. 10, the channel server acquires the block data source 160 from the database of the LOC 24 and transmits the same to a channel multiplexer 162. Stream data sources 164, which may comprise the above mentioned real-time motion, background music, etc., are also input to the channel multiplexer 162, where they are appropriately combined with the block sources and passed to a forward error correction (FEC) encoder 166, which adds the appropriate FEC code. The multiplexed and FEC coded data is passed to a modulator 168 and transmitted via a data link to the CATV headend 169. After reception by the appropriate presentation player 54, the sequence of events is reversed. At the presentation player 54, a demodulator 170 acts to remove the distribution frequency carrier from the data, forward error correction on the data is performed by decoder 172 and the block data are separated by a channel demultiplexer 174 to produce distinct block data 176 and stream data 177 which are processed separately by the presentation player 54.

As shown with more particularity in FIG. 11, each of the plurality of channel servers 36 resident in an LOC 24 acquires particular block data 160 for distribution. The stream data, which generally comes from independent sources denoted in FIG. 11 by A, B, C, are multiplexed onto a single data channel by source multiplexer 180 and pass sequentially through each of the individual channel multiplexers 182 which are associated with each of the channel servers 36. In this way, the appropriate block data 160 is interspersed with particular source data for each channel server 36. The combined data is then passed to the FEC encoders and modulators associated with each distribution channel.

The particular method used for multiplexing the block data and stream data to support "real-time" motion displays and other stream channel usages is schematically illustrated in FIG. 12. FIG. 12 (*a*) illustrates the block data channel 192 and the stream data channel 194, as a function of time. As seen, the block data channel 192 comprises adjacent blocks of data having different lengths. Typically the transmission rate of the block data channel is 18 megabits/sec. Long blocks are generally data objects which contain compressed video images and which may range in size from 20 to 80 kilobytes. As noted above, these video blocks may consist of either individual still-video frames, or a sequence of still-video frames which, when shown with appropriate timing instructions encoded in a script, will display fixed motion sequences. Audio data and graphics overlay information comprise shorter blocks of data. The shortest blocks of data will generally be script data objects and data objects representing key press echo characters.

In a preferred embodiment of the present invention, the stream data channel 194, generally consists of up to 96 independent and physically distinct stream channels which have been multiplexed onto a single transmission channel. Each of the 96 stream channels may have real time motion data, background audio data, etc. Further, depending upon the video and audio fidelity required, a particular data source may be transmitted over more than one physical stream channel simultaneously. For example, if stream data consists of only spoken words then one channel may provide a high enough data rate to ensure appropriate fidelity. On the other hand, FM quality broadcast may have to be encoded into 4–8 physical stream channels to provide the appropriate bandwidth.

In a preferred embodiment of the present invention, the block data channel and 96 possible stream data channels are time-multiplexed onto a single 24 megabit/sec distribution channel as shown in FIG. 12(*b*) and (*c*). In particular, a 4 KHz clock provides the timing for producing frame synchronization (synch) characters at 250 microsecond intervals along the distribution channel. The position of sequential synch characters is schematically represented in FIG. 12 by reference numeral 196. Since the maximum data capacity of the distribution channel is 24 megabits/sec, the 4 KHz clock permits 6,000 bits to be interspersed in the time interval between two frame synch characters including all housekeeping data such as forward error detection and correction. This time-slice of data is called a "frame". Framing of data in this manner is typically performed by forward error correction encoders, because the standard FEC algorithms are generally unable to efficiently process blocks of data which have varying lengths. In this invention, the framing technique is also utilized to multiplex block and stream data channels together in an appropriately encoded manner.

The particular manner of multiplexing employed by the digital interactive system of the present invention is further depicted in FIG. 12(*b*). Following each frame synch character (which may occupy 16 bits), is an 8 bit stream control character denoted by reference numeral 198. The number of stream channels being transmitted, and the assignment of channels to particular stream sources is specified by a control channel derived from the concatenation of these stream control characters 198. Each of the stream data channels is divided into one byte increments, and a single byte of each stream data channel is consecutively interspersed along each subsequent frame in the space following the stream control character. For example, after the control character, frame 1 will contain the first byte 200 of stream data channel 1, followed by the first byte 202 of stream data channel 2, etc., until as many as 96 stream data channels are distributed along the frame. The next byte of data corresponding to each of the 96 stream data channels is correspondingly positioned in frame 2 and so on. For example, byte 204 represents the second byte of stream data channel 1, byte 206 represents the second byte of stream data channel 2, etc. After positioning all the stream data channels in this manner the remaining space in each frame is sequentially filled with the block data. If a block is too large to fit within the space of a single frame, it continues to fill the available space in succeeding frames, as shown in FIG. 12(b). To complete the multiplexing scheme, bits required by the forward error correction (FEC) algorithms are added and dispersed along each frame as shown in FIG. 12(c).

Since each of the stream data channels has a single 8-bit byte of information interspersed at a 4 KHz frame rate, this encoding method permits the stream data sources to be distributed at a rate of 32 Kbits/sec per stream channel. A 32 Kbit/sec data rate, although not adequate to support real-time motion video over a full television screen, is sufficient to provide a real time display in a small corner of the screen, particularly when use is made of available interframe and intraframe compression techniques.

FIG. 13 shows the components comprising the distribution channel multiplexer 162, which act to combine the block data and stream data in the manner illustrated above. As described, each of the 96 channels of stream data 194 pass through the multiplexer at a rate of 32 Kbits/sec. Block data 192 is supplied from channel server 36.

With particular reference to FIG. 13, clock controller 118 receives a 20 megabit/sec clock from FEC encoder 166 and generates a 4 KHz frame clock. A bit clock of approximately 17-18 megabits/sec is output from the clock controller 118 to channel server 36 on line 99. This clock controls the clocking of block data bits into a data buffer 110 which is one frame (6,000 bits). Stream control information is transmitted to the multiplexer controller 112 from the channel server 36 along line 114. The stream control information defines how many stream channels are presently active on the system, and identifies the type of stream source which is available on each of the active stream channels (e.g. country western music, motion video for a particular subscriber, etc.). In addition, the control channel information on line 114 also defines which particular stream data channels are to be selected for combining with the block data. This information is transmitted to the time slot selector 98 which comprises a data buffer.

As the stream data moves through the channel multiplexer, it is loaded into an input buffer 116. When the time slot selector 98 in response to information supplied by the stream control channel, recognizes that the data in the input buffer 116 is stream data which is to be distributed along the distribution channel supported by channel server 36, it acquires the data from the input buffer 116. The time slot selector 98 is a data buffer which, based upon information received from the multiplexer controller 112 holds the data until the particular time slot allocated to this particular stream channel is ready to be filled in data buffer 110. Under control of multiplexer controller 112, and the timing information obtained from clock controller 118, the time slot selector 98 inserts the stream data 177 into the appropriate time slot of data buffer 110 which corresponds to a particular stream channel. After all the stream data has been properly positioned within the single frame data buffer 110, the channel server 36, under control of the bit clock transmitted along line 99, fills the remaining space of data buffer 110 with block data 176. When data buffer 110 is full, the data which it contains, i.e. the block data 176 and stream data 177, and which is appropriately multiplexed according to the format shown in FIG. 12(b), is output to the forward error correction encoder 166, where error correction bits are added to the data. Forward error correction encoder 166 transmits the fully formatted and multiplexed data to modulator 168, where it is modulated at the rate of 24 megabits/sec onto a base frequency for transmission to the CATV headend.

By virtue of this particular multiplexing scheme, in which block data 176 and stream data 177 are combined, the interactive digital system of the present invention makes it possible to transmit block data 176, comprising video images, audio, control data in the form of scripts, etc., in combination with stream data 177 which provides for real time motion video, background music, etc., to the CATV headend on a single distribution channel.

THE PRESENTATION PLAYER

Referring to FIG. 2, upon receipt of the multiplexed and baseband modulated data from a particular channel server 36 of the local operating center 24, the CATV headend 38 upconverts the data and places it onto one of the distribution frequencies which have been allocated to the digital interactive system. The CATV headend 38 transmits this data throughout its cable network on that distribution frequency. Generally, the distribution frequency is outside of the normal tuning band which is accessible to subscribers of the cable service. In order to convert the digital data into a presentation which is compatible with the standard television signal format, and perform the routing of the presentation to the subscriber who has requested it, a plurality of field devices known as presentation players 54 are distributed throughout the geographical area serviced by the cable company.

As outlined above, the presentation player 54 is a device that captures, stores and expands digital data which is transmitted to it in order to produce a final product presentation which it then transmits t the particular subscriber who has requested the information via his Touch-Tone telephone 42. As shown in FIG. 2, the presentation player is mounted parallel to a secondary distribution feeder line 50, so that in the event of failure, other signals on the feeder line 50 will not be affected. As further shown in FIG. 2, presentation player 54 is typically positioned adjacent to a bridge amplifier 48 of the cable distribution system, and is connected via the secondary distribution feeder line 50 to approximately forty drop lines 52 which go to individual subscribers. A presentation player may also be connected across more than one feeder line.

The presentation players 54 monitor all the CATV distribution frequencies that are being transmitted and lock in on the particular distribution frequency which is transmitting data for the digital interactive multimedia presentation and communications system. Each presentation player has a unique identification code in the form of a digital address. The presentation players 54 select for further processing only that data which is addressed to them. Each presentation player 54 then converts the data that is destined to a particular subscriber along its line, produces a finished presentation, and transmits the finished presentation on the correct display channel frequency which the subscriber is viewing.

Referring to FIG. 14, in a preferred embodiment, the presentation player 54 incorporates at least one and as many as eight subscriber servers 120. Each subscriber server 120 is shared amongst a small group of subscribers serviced by the feeder line 50 to which it is connected. Once the shopping session is in progress, the subscriber server 120 is devoted to a single subscriber on that particular secondary distribution feeder line 50, who has captured it on a contention basis. If the subscriber server 120 is busy with a shopper, the second and subsequent would-be shoppers on that distribution feeder line 50 who view the first shopper's display channel will see the presentations that are transmitted to the active shopper, but will not be able to participate. If more than one display frequency is available to the system, then several subscriber servers 120 may be simultaneously transmitting along the same feeder line, with each one broadcasting on a different display channel frequency to service different active subscribers. A presentation player 54 may also be connected to as many as four separate feeder lines 50 which emanate from a bridge amplifier 48. Each feeder line may have several subscriber servers 120 connected to it which broadcast on different display frequencies. Subscriber servers 120 which are connected to separate feeder lines may broadcast on the same display frequency to different active subscribers, since this arrangement does not result in any interference. However, when a subscriber has captured the use of a particular subscriber server 120, no other subscriber may use it.

As shown in FIG. 14, in addition to the plurality of subscriber servers 120, each presentation player 54 includes a presentation player converter 122 and a transponder 124. The function of presentation player converter 122 is to locate, tune to, and demodulate the distribution channel frequency provided by the CATV headend 38. The demodulated, but still multiplexed data is transferred along the subscriber server bus 125 to the subscriber servers for further processing. In broad terms, the presentation player converter 122 selects the correct distribution channel frequency, demodulates the signal received on that channel to form a digital stream appropriate for local processing by the subscriber servers 120, and performs forward error correction.

The transponder 124 obtains and stores diagnostic information relating to the status and activity of all the components within the presentation player 54, and transmits this information upon command to field service vehicles which travel through the service area.

FIG. 15 illustrates with more particularity, the basic components which comprise the presentation player converter 122. Referring to FIG. 15, one of the elements of the presentation player converter 122 is a broadband frequency agile receiver 130. It is capable of being cycled through the CATV frequency spectrum by the converter controller 132 so that it sequentially receives all of the distribution channel frequencies which are being transmitted by the CATV headend 38 down the secondary distribution feeder line 50. The digital interactive multimedia presentation and communications system will be allocated at least one but possibly several distribution frequencies. The frequency agile receiver 130 receives the incoming RF signal which is modulated with digital data. In conventional fashion, the frequency agile receiver 130 outputs an intermediate frequency (IF) to demodulator 134. The demodulated data is passed on in serial fashion to the forward error correction processor 136. The demodulated and error corrected data is then placed onto the subscriber server bus 125 which connects to the converter controller 132, and to the plurality of subscriber servers 120 in the presentation player 54.

The converter controller 132 controls the overall functions within the converter 122. As shown in more detail in FIG. 16, the converter controller 132 has a central processing unit (CPU) 200 which communicates with read-only memory (ROM) 200, random access memory (RAM) 201, and electrically-erasable programmable read only memory (EEPROM) 204. The ROM 201 generally contains the start up program routines, whereas the RAM stores the operating and diagnostic programs as well as diagnostic data collected about the components of the presentation player 54 for transmission upon command via the transponder 124 to personnel in field service vehicles. The CPU 200 responds to incoming data on the bus 125, and through peripheral interface adapters 206 and 208 sends output signals which control the frequency agile receiver 130 and the transponder 124.

The converter controller 132 is able to cycle the frequency agile receiver 130 through the appropriate CATV frequency spectrum until it finds distribution frequency which is transmitting digital data in the format established by the digital interactive system of the present invention. A distribution channel with corresponding frequency is selected according to a procedure described below. The distribution frequency is stored in the EEPROM memory 204 so that this information can survive power failures and be used in a power resumption sequence to re lock the frequency agile receiver 130 onto the proper distribution frequency, without the necessity of once again cycling through all possible distribution frequencies. The converter controller 132 also stores within its EEPROM memory 204 information which designates the distribution channel that has been assigned to that particular presentation player 54. This information uniquely identifies the channel server 36 (FIG. 2) within the digital interactive system which services that particular presentation player 54. It further stores within the address switches 210 the identifying number of the presentation player 54. The identifying slot number for the subscriber servers is included as part of the presentation player identification.

The converter controller 132 can perform extensive diagnostics on itself and the devices that it controls, and report fault conditions and other traffic and status information to the transponder 124. New program logic which is occasionally distributed from the local operating center for the purpose of reprogramming the presentation players, is also received, stored in RAM 201, and acted upon by the converter controller 132.

As each distribution channel is transmitted from a channel server 36 to the CATV headend 38, certain information comprising a channel status message is periodically inserted into the stream of digital data. Typically this channel status message is transmitted every ten seconds as block data. The format of the channel status message is illustrated in FIG. 17. With reference to FIG. 17, the first data block 310 in the channel status message after a message identifier 300 represents data which identifies the particular channel server 36 that is transmitting the status message, and the number associated with its distribution channel. The next data block 320 is a channel availability message, which indicates whether the distribution channel has sufficient capacity to service additional presentation players 54. The identification of the particular CATV company (or companies) serving that particular feeder cable is given in the next data block 330. This is followed by a list of display channel numbers that are allocated to the digital interactive system. As shown in the exploded portion of FIG. 17, the list of display channels for each CATV company provides a display channel number, and a corresponding telephone number to call when logging onto the digital interactive system from that display channel. The identification numbers of those subscriber server 120 which can service a particular display channel are also supplied in the channel status message. In the example shown in FIG. 17, the odd numbered subscriber servers are allocated one display channel, while the even numbered subscriber servers transmit on a second display channel. Other arrangements may also be envisioned for allocating subscriber servers 120 to particular display channels.

A new presentation player 54, when first installed in the field, has a table stored in the ROM of its converter controller 132, which lists all standard CATV distribution frequencies. When a presentation player is powered up for the first time, the converter controller 132 begins to cycle the frequency agile receiver 130 through all of the possible distribution CATV frequencies. The corresponding signals are sent to the demodulator 134, which in turn transmits the demodulated signals to the FEC processor 136 and along bus 125 to the converter controller 132. As the broadband receiver 130 is automatically stepped through each of the possible distribution frequencies, the demodulator 134 attempts to demodulate the data. If unsuccessful, the receiver 130 is stepped to the next possible CATV frequency, and so on, until the receiver 130 finds a frequency which can be properly demodulated and which therefore corresponds to a distribution channel for the digital interactive system.

When a distribution channel is found, the channel status message that is transmitted along that channel at regular intervals is examined to see whether additional presentation players are being accepted. If the channel availability message indicates the additional traffic is being accepted, that distribution channel's ID number and the frequency at which it is transmitting are stored in the converter controller's electrically erasable programmable read only memory (EEPROM) 204. Until otherwise instructed, the presentation player automatically adopts this distribution channel and frequency for all subsequent communications. Since the distribution channel's ID number and distribution frequency are stored in the EEPROM 204, this information is preserved in the event of a power failure, and upon resumption of operation, the presentation player will immediately tune itself to that particular frequency and wait to see if this frequency still contains the correct distribution channel identifier 310 value as stored in EEPROM 204. If not, a new distribution channel will be found as described above. In this manner, converter controller 132 ensures that the presentation player 54 finds a distribution frequency which corresponds to a distribution channel having excess capacity, and adopts that frequency and channel for all future transmissions.

When a subscriber logs onto the system for the first time, the "attractor" screen he sees on his television set contains information which identifies the subscriber's presentation player 54, the distribution channel serving the subscriber's presentation player, and the subscriber's CATV cable company. Before the subscriber can use the system's services, he is requested to key in this information via his Touch-Tone telephone. In this manner, the system learns the identity of the distribution channel (i.e. channel server), the presentation player 54 and the subscriber server(s) 120 which can communicate with that particular subscriber.

The present invention further anticipates that the digital interactive multimedia presentation and communications system will adopt a policy that if, after a fixed period of time, a presentation player 54 is not receiving information over its selected distribution channel frequency, the presentation player 54 will select a new distribution channel frequency in the manner described above. Further, the digital interactive system has the capability of transmitting new software through the distribution channel to converter controller 132, thereby reprogramming the converter controller 132 in the field. In this fashion, the procedure for selecting a distribution channel frequency may be changed by the LOC 24. For example, if a decision by a CATV cable company results in the distribution channel frequencies being changed, a message may be transmitted advising presentation players using "channel 2", for example, to tune to "channel 4" for all future communications with the LOC. Still other means of distribution channel frequency selection could be provided by the LOC individually advising each presentation player 54 as to which distribution channel it is to use.

Each of the plurality of subscriber servers 120 in the presentation player 54 monitor the digital information which is being transmitted down the subscriber server bus 125, and receives and stores data which is addressed to its particular identification number or address. As described previously, the data that is being transmitted to the subscriber server 120 generally includes digital representations of audio, video images, and scripts which define the makeup and timing of presentations. In particular, these scripts determine when and for what period of time the subscriber server 120 will transmit the particular audio and video images which comprise a presentation to the subscriber and also which graphics information (such as characters in a given font, color or size) will be overlaid upon the video images.

FIG. 18 shows the major components which comprise a subscriber server 120. In accordance with a preferred embodiment of the present invention, the subscriber server 120, upon receipt of data which is addressed to its particular identification number, utilizes its central processor unit (CPU) 400 to demultiplex the incoming data into separate block data and stream channel data. Accordingly, the CPU 400 acts as the channel demultiplexer 174 (FIG. 10) All of the demultiplexed data is appropriately labeled and stored within the RAM 410 of the subscriber server 120. ROM 430 provides permanent storage for initialization programs. In order to perform the demultiplexing function, the CPU 400 looks at each frame of incoming multiplexed data, and reads the first byte, which represents the stream control channel. In combination with information which it acquires from the script, the CPU 400 has sufficient information to perform the demultiplexing function.

More specifically, stream data which is always available on a general basis within the system, such as various kinds of background music, may be requested through a script. For example, the script may call for country and western music to be played as background during a particular presentation. The stream control channel will tell the subscriber server 120 that country and western music is being broadcast, for example, on stream channels 1, 2 and 3. Stream data channels which are designated to go to a specific subscriber, such as real time motion or stock market quotes, will also be designated and allocated to a particular subscriber by information in a script. Thus, by combining information from the script, with that broadcast on the stream control channel, the CPU 400 knows which physical stream channels are particularly destined to the subscriber it is currently serving.

By properly clocking each frame, the CPU 400 selects those particular stream channels and stores them in RAM 410. By reading the stream control channel, the CPU 400 further identifies how many stream data channels are being distributed at any time, and can therefore calculate where the block data begins. The CPU 400 proceeds to read the appropriate block data into other locations within the RAM 410. At the beginning of each block of data is a descriptor which designate the length of the particular block. This information allows the CPU 400 to properly concatenate and reconstruct the individual block data objects which were parsed during the multiplexing process into different frames. In this manner, the CPU 400 acts to demultiplex the incoming data from the subscriber server bus 125, and causes the separated block and stream data to be stored in properly identified locations within RAM 410.

In broad terms, the further processing of the demultiplexed data by the subscriber server 120 includes the expansion and conversion of the compressed digital audio and video image data into a standard television signal format, and the transmission of this information according to the script along a display channel to which the subscriber is tuned.

Referring to FIG. 18, the CPU 400 determines which of the information it has received is a script, and then uses the script to control audio processor 412 and image processor 414 which expand the audio and video data respectively. The digital audio processor 412 decompresses the audio data. After passing through a data buffer 416, the expanded audio data is passed to digital to analog converter 418 and then to a video modulator 420 where the audio data is placed into an NTSC or other standard television signal format. The digital image processor 414, in addition to being able to expand a previously compressed video image, includes a graphics overlay capability. The expanded video image is then passed to a frame buffer 422, from which it is input to a digital to analog converter 424. The analog video output of the digital to analog converter 424 is combined with the audio signals in video modulator 420, to produce the NTSC or other standard baseband TV signal. The CPU 400 within the subscriber server 120 notifies a frequency agile transmitter 426 of the appropriate display frequency, and the baseband signal is upconverted by the frequency agile transmitter 426 to that display frequency. The presentation is then transmitted along the feeder line 50 to the particular subscriber who has requested the information and to all other cable subscribers served by that feeder. Accordingly it is through presentation player 54 that the requested presentations are transmitted on pre assigned display frequencies to particular subscribers.

Devices to perform the expansion and digital to analog conversion are commercially available from companies such as Texas Instruments (Model No. TMS320C25) or from RCA Laboratories Digital Video Interactive (DVI), VDP1 and VDP2. Transmitting devices are readily available and are common parts in commercial VCR's.

Attached externally to each subscriber server 120 is a standard four-bit manually setable switch (not shown). When presentation player 54 is installed within a CATV cable system, this four-bit switch is set to a predetermined number which designates the particular CATV cable system in which it is to be installed. The designation of the CATV cable system is transmitted from subscriber server 120 and appears on the first screen viewed by the subscriber when he tunes to the digital interactive multimedia presentation and communications system. As previously discussed, other relevant information about the subscriber and the presentation player servicing the subscriber is also present on this first screen. Upon request from the system during the initial logon procedure, the number designating the subscriber's CATV cable system is entered via the Touch-Tone keypad, and transmitted to the LOC of the system along with this other relevant information.

In an alternative embodiment of this invention, a television set top presentation player which services a single subscriber may be implemented. The set-top player may be integrated with the converter appliance generally supplied by the CATV company when the initial cable connection is made. Whereas presentation players which are field resident serve many subscribers who contend for their use in party line fashion, the set-top player is designed to serve only one subscriber and therefore requires only one subscriber server. Since the set-top player is designed for indoor use, the environmental and power consumption requirements are different from those for the field resident presentation players. However, in all other respects the set-top presentation player functions in the same way as the presentation players which are resident in the field.

A fault reporter is provided within the presentation player, and comprises a subsystem which receives and stores status information from various parts of the presentation player, and then transmits these messages upon command. The communications medium for the fault reporter is a transponder, which is designed to transmit its diagnostic information to a service vehicle that requests and receives these transmissions. The diagnostic data would be interpreted by equipment within the service vehicle. Alternatively, the fault reporter may be a software device distributed between the converter controller and the subscriber servers whose function is to report some faults immediately to the subscriber, and to store other fault indicators for transmission to the field service vehicle upon demand.

Although illustrative embodiments of the present invention have been described in detail with reference to the accompanying drawings, it is to be understood that the invention is not limited to these precise embodiments. The presently preferred embodiments are to be considered as merely illustrative and not restrictive and a latitude of modifications, changes and substitutions is intended to be encompassed by the foregoing disclosure. The scope and spirit of this invention, as recited in the following claims, embraces all such modifications, changes, and substitutions which come within the meaning and range of equivalence of the claims.

What is claimed is:

1. An interactive multimedia presentation and communications system concurrently accessible to a plurality of subscribers wherein each of said plurality of subscribers may input his choice of a particular multimedia presentation for viewing on a television set from a plurality of such presentations available on the system, each of said plurality of presentations generally including a sequence of video images, accompanying audio, and a menu of options related to said presentation, and in response to viewing said presentation, may input at least one option to perform transactions related to said presentation or may choose another particular presentation for viewing on said television set comprising:

a) computing means for preparing, storing, processing and transmitting digital data related to said plurality of multimedia presentations and to the performance of said transactions, and which, in response to input from the subscriber performs said transactions or retrieves and processes digital data related to said particular multimedia presentation;
 b) input means available to each of said plurality of subscribers for communicating with said computing means;
 c) signal processing means for receiving, storing and processing digital data related to said particular multimedia presentations that have been chosen and for converting said digital data into analog TV signals and transmitting said analog TV signals to said television set of each of said plurality of subscribers who have chosen said particular multimedia presentations; and
 d) signal transmission means for transmitting digital data from said computing means to said signal processing means.

2. The interactive multimedia presentation and communications system of claim 1 wherein said input means comprises a telephone.

3. The interactive multimedia presentation and communications system of claim 2 wherein said input means further comprises in addition to said telephone a local access point at which signals from a plurality of telephones are combined and transmitted to said computing means along a telephone line.

4. The interactive multimedia presentation and communications system of claim 1 wherein said computing means comprises a plurality of computers to form a distributed processing architecture.

5. The interactive multimedia presentation and communications system of claim 1 wherein said signal transmission means comprises a transmitter capable of transmitting said digital data along a CATV cable network.

6. The interactive multimedia presentation and communications system of claim 1 wherein said signal processing means comprises a transmitter capable of transmitting said analog TV signals along a CATV cable network.

7. The interactive multimedia presentation and communications system of claim 1 wherein said computing means further comprises a plurality of local operating centers which can communicate with each other, each of which includes a plurality of computers to form a distributed processing architecture.

8. The interactive multimedia presentation and communications system of claim 7 which further comprises a regional operating center including a plurality of computers to form a distributed processing architecture, said regional operating center capable of storing all data pertaining to its geographical region and capable of communicating with said plurality of local operating centers.

9. The interactive multimedia presentation and communications system of claim 7 wherein data which is not present at one of said plurality of local operating centers may be imported, upon demand by said subscribers, from others of said plurality of local operating centers.

10. The interactive multimedia presentation and communications system of claim 8 wherein data which is not present at said plurality of local operating centers may be imported from said regional operating center upon demand from said subscribers.

11. The interactive multimedia presentation and communications system of claim 1 wherein said sequence of video images includes still frame video, predetermined images for displaying fixed motion video, and real time live motion video.

12. The interactive multimedia presentation and communications system of claim 1 which further comprises a consumer service center capable of communicating with said computing means and said plurality of subscribers, from which each of said subscribers may be provided assistance.

13. The interactive multimedia presentation and communications system of claim 1 which further comprises a client network services facility capable of communicating with said computing means to permit interchange of information between said computing means and commercial clients who have placed said multimedia presentations on said system.

14. The interactive multimedia presentation and communications system of claim 1 which further comprises a store manager facility capable of communicating with said computing means, and including a production facility which permits commercial clients to prepare, store and edit said multimedia presentations on said system.

15. The interactive multimedia presentation and communications system of claim 1 wherein said multimedia presentations are tailored to particular markets based upon market and demographic data supplied to the system, and wherein said computing means utilizes said demographic and market data to determine which of said plurality of multimedia presentations may be selected by one of said plurality of subscribers.

16. The interactive multimedia presentation and communications system of claim 1 wherein said plurality of multimedia presentations relate to products and services available from commercial clients, and wherein viewing of said selected multimedia presentations and performance of said transactions permits each of said plurality of subscribers to individually shop for, select, and purchase said products and services.

17. The interactive multimedia presentation and communications system of claim 1 wherein said input communicated to said computing means via said input means are transmitted from said computing means to said television of said subscriber who has entered said input, to provide a feedback indication that said input has been properly received by said computing means.

18. An interactive multimedia presentation and communications system accessible to a plurality of subscribers wherein each of said plurality of subscribers may input a selection of a particular multimedia presentation for viewing on a television set from a plurality of such presentations available on the system, each of said plurality of presentations generally including a sequence of video images, accompanying audio, and a menu of choices related to said presentation, and in response to viewing said presentation, may input at least one of said choices to perform transactions related to said presentation and to select another particular presentation for viewing on said television set comprising:

a) one or more local operating centers for preparing, storing and processing digital data related to said plurality of multimedia presentations and to the performance of said transactions, each of said local operating centers including a plurality of computers, a bus system for interconnecting said computers to form a distributed processing architecture, a plurality of processes executable by said computers which implement said transactions and enable said preparing, storing and processing of said digital data and which are capable of being executed by said computers in response to said input;

b) a telephone input means available to each of said subscribers for communicating with one of said local operating centers;

c) a plurality of presentation players, each presentation player connected to one of said operating centers and to a group of subscribers, and including means capable of receiving, storing and further processing digital data into analog TV signals and means for transmitting said analog TV signals to said television set of said one of said group of subscribers who has selected said particular presentation; and d) signal transmission means for transmitting digital data from each of said local operating centers to said plurality of presentation players connected thereto.

19. The interactive multimedia presentation and communications system of claim 18 wherein said telephone input means comprises a Touch-Tone telephone keypad.

20. The interactive multimedia presentation and communication system of claim 19 wherein said telephone input means further comprises, in addition to said Touch-Tone telephone keypad, a local access point at which signals from a plurality of telephones are combined and transmitted to said local operating center along a telephone line.

21. The interactive multimedia presentation and communications system of claim 18 wherein said plurality of computers comprises a plurality of single-board computers.

22. The interactive multimedia presentation and communications system of claim 18 wherein said signal transmission means comprises a transmitter capable of transmitting said digital data along a CATV cable network.

23. The interactive multimedia presentation and communications system of claim 18 wherein each of said plurality of presentation players is capable of transmitting said analog TV signals along a CATV cable network to said television set of said one of said group of subscribers connected thereto who has selected said particular presentation.

24. The interactive multimedia presentation and communications system of claim 18 wherein each of said local operating centers is capable of communicating with others of said local operating centers, and can import data demanded by subscribers from said others of said local operating centers.

25. The interactive multimedia presentation and communications system of claim 18 which further comprises a regional operating center including a plurality of computers, to form a distributed processing architecture, said regional operating center capable of storing in digital format all data pertaining to its geographical region, and being further capable of communicating with each of said local operating centers, and transferring data which has been demanded by subscribers to ones of said local operating centers who request said data.

26. The interactive multimedia presentation and communications system of claim 18 wherein each of said local operating centers further comprises a plurality of chassis, each of said chassis including a plurality of slots which accommodate said computers.

27. The interactive multimedia presentation and communications system of claim 18, wherein said plurality of processes are dynamically distributed among said plurality of computers for execution on said plurality of computers in response to varying computing demands placed on said local operating center.

28. The interactive multimedia presentation and communications system of claim 18 wherein one of said processes that may be executed on said plurality of computers comprising one of said local operating centers is a log-on server process wherein said log-on server process executing on said plurality of computers provides each of said subscribers with access to said local operating center.

29. The interactive multimedia presentation and communications system of claim 18 wherein one of said processes that may be executed on said computers is a session server said session server process executing on said computers is assigned to each of said subscribers who log into said system, and which, in response to said subscriber's selections, provides means for said subscriber to navigate through said system to obtain desired multimedia presentations, retrieve digital data representative of said presentations, and obtain the services of others of said processes as required by said subscriber.

30. The interactive multimedia presentation and communications system of claim 18 wherein said sequence of video images includes still-frame video, predetermined images for displaying fixed-motion video, and real-time live-motion video.

31. The interactive multimedia presentation and communications system of claim 18 wherein said plurality of multimedia presentations relate to products and services available from commercial clients, and wherein viewing of said selected multimedia presentations and performance of said transactions permits each of said plurality of subscribers to individually shop for, select, and purchase said products and services.

32. The interactive multimedia presentation and communications system of claim 21 in which each of said local operating centers further comprises at least one modem, each of said modems connected to one of said single board computers to provide a telephone communications link.

33. The interactive multimedia presentation and communications system of claim 21 wherein each of said local operating centers further comprises at least one gateway device, each gateway device interfaced to one of said single-board computers to provide an external communications link to other computing systems.

34. The interactive multimedia presentation and communications system of claim 21 wherein each of said local operating centers further comprise a digital data storage facility including at least one first set of peripherals having a disk drive and a disk drive controller, each first set of peripherals interfaced to one of said plurality of single-board computers.

35. The interactive multimedia presentation and communications system of claim 21 wherein each of said local operating centers further comprises at least one second set of peripherals including a multiplexer and a modulator, each second set of peripherals interfaced to one of said plurality of single-board computers and to said signal transmission means.

36. The interactive multimedia presentation and communications system of claim 26 wherein each of said chassis provides an industry standard system bus for transferring data between said computers on the same chassis.

37. The interactive multimedia presentation and communications system of claim 36 wherein the industry standard system bus further comprises an industry standard Multibus II system bus.

38. The interactive multimedia presentation and communications system of claim 26 wherein communications between each of said plurality of computers comprised within said plurality of chassis is provided by a second industry standard system bus.

39. The interactive multimedia presentation and communications system of claim 38 wherein said second industry standard system bus comprises an industry standard Small Computer Systems Interface (SCSI) bus to provide communications between each of said plurality of computers comprised within said plurality of chassis.

40. The interactive multimedia presentation and communications system of claim 26 wherein each of said local operating centers further comprises a plurality of communications interfaces connected between ones of said plurality of single-board computers which are on different chassis, to provide communications between said plurality of single board computers comprised within a plurality of said chassis.

41. The interactive multimedia presentation and communications system of claim 32 wherein one of said processes which said single-board computers interfaced to said modem are capable of executing a voice network server process, said single board computers executing said voice network server process communicating via said modem with said telephone input means available to each of said subscribers whereby said single board computers executing said voice network server process can acquire and process said selections entered via said telephone input means.

42. The interactive multimedia presentation and communication system of claim 34 wherein one of said processes which said single-board computers that comprise said digital data storage facility are capable of executing is a volume manager server, whereby said single board computers executing said volume manager server process provide read and write access to all of said digital data stored in said digital data storage facility to others of said processes which request said data.

43. The interactive multimedia presentation and communications system of claim 35 wherein one said processes which said single-board computers that are interfaced to said second set of peripherals are capable of executing is a channel server whereby said single board computers executing said channel server process provide data related to said multimedia presentations to said signal transmission means for transmission to a CATV headend which transmits said data along its CATV distribution network to said plurality of presentation players connected thereto.

44. An interactive shopping system accessible to a plurality of subscribers on a CATV cable network, wherein each of said plurality of subscribers may input a selection for viewing on a television set a particular multimedia presentation from a plurality of such presentations available on the system, each of said plurality of presentations depicting products or services and generally including a sequence of video images, accompanying audio, and a menu of choices related to said products or services, and in response to viewing said presentation, may input at least one of said choices to perform shopping transactions related to the purchase of said products or services, and to select another particular presentation depicting other products or services for viewing on said television set comprising:

a) one or more local operating centers each of which includes means for preparing, storing and processing digital data related to said plurality of multimedia presentations and to the performance of said shopping transactions, each of said local operating centers further having a plurality of computers, a bus system for interconnecting said computers to form a distributed processing architecture, a plurality of processes executable by said computers which implement said transactions and enable said preparing, storing and processing of said digital data to simulate the environment of an electronic mall and which are capable of being executed by said computers in response to said selections;

b) an input means available to each of said subscribers for communicating with one of said local operating centers;

c) a plurality of presentation players, each presentation player connected along a CATV cable network to one of said operating centers and to a group of subscribers, and including means capable of receiving, storing and further processing digital data related to said particular multimedia presentation that has been selected by one of said group of subscribers, and further means for converting said digital data into analog TV signals and means for transmitting said analog TV signals along said cable distribution network to said television set of said one of said group of subscribers who has selected said particular presentation; and d) signal transmission means for transmitting digital data from each of said local operating centers along said CATV distribution network to said plurality of presentation players connected thereto.

45. The interactive shopping system of claim 44 wherein said multimedia presentations are tailored to particular markets, and wherein demographic information available to said local operating center about each of said subscribers is used to define and limit the plurality of multimedia presentations which each of said subscribers may select.

46. The interactive shopping system of claim 44 wherein said sequence of video images includes still-frame video, predetermined images for displaying fixed-motion video, and real-time live-motion video.

47. The interactive shopping system of claim 44 which further comprises a consumer service center capable of communicating with said local operating centers and said plurality of subscribers, from which subscribers may request assistance.

48. The interactive shopping system of claim 47 wherein a consumer service representative at said consumer service center can view the same multimedia presentation that is being viewed by one of said subscribers requesting assistance.

49. The interactive shopping system of claim 48 wherein said subscriber requesting assistance can view a real-time live-motion video of said consumer service representative.

50. The interactive shopping system of claim 44 which further comprises a client network services facility capable of communicating with said local operating centers to permit interchange of information between said local operating centers and commericial clients who have placed said multimedia presentations on said system.

51. The interactive shopping system of claim 44 which further comprises a store manager facility capable of communicating with said local operating centers, and including a production facility which permits commercial clients to prepare, store and edit said multimedia presentations on said system.

52. The interactive shopping system of claim 44 wherein each of said local operating centers is capable of communicating with others of said local operating centers, and can import data demanded by subscribers from said others of said local operating centers.

53. The interactive shopping system of claim 44 which further comprises a regional operating center including a plurality of computers to form a distributive processing architecture, said regional operating center capable of storing in digital format all data pertaining to its geographical region, and being further capable of communicating with each of said local operating centers and transferring upon demand by subscribers to ones of said local operating centers who request said data.

* * * * *